(12) United States Patent
Ito et al.

(10) Patent No.: US 6,762,639 B2
(45) Date of Patent: Jul. 13, 2004

(54) BOOSTER CIRCUIT CAPABLE OF SWITCHING BETWEEN A CONVENTIONAL MODE AND A LOW CONSUMPTION CURRENT MODE

(75) Inventors: Yutaka Ito, Tokyo (JP); Takeshi Hashimoto, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 0 days.

(21) Appl. No.: 10/201,553

(22) Filed: Jul. 23, 2002

(65) Prior Publication Data

US 2003/0025549 A1 Feb. 6, 2003

(30) Foreign Application Priority Data

Jul. 24, 2001 (JP) ........................................ 2001/222835

(51) Int. Cl.[7] .............................. G05F 1/10; G05F 3/02
(52) U.S. Cl. ......................................................... 327/536
(58) Field of Search ................................. 327/536, 589; 363/59, 60

(56) References Cited

U.S. PATENT DOCUMENTS

| | | | | |
|---|---|---|---|---|
| 5,532,916 A | * | 7/1996 | Tamagawa | 363/62 |
| 5,774,012 A | | 6/1998 | Im | 322/536 |
| 5,936,459 A | * | 8/1999 | Hamamoto | 327/536 |
| 6,259,612 B1 | | 7/2001 | Itoh | 363/60 |
| 6,504,422 B1 | * | 1/2003 | Rader et al. | 327/536 |

FOREIGN PATENT DOCUMENTS

| | | |
|---|---|---|
| JP | 9-231752 | 9/1997 |
| JP | 9-238463 | 9/1997 |
| WO | WO 98/44621 | 10/1998 |

\* cited by examiner

*Primary Examiner*—Terry D. Cunningham
*Assistant Examiner*—Quan Tra
(74) *Attorney, Agent, or Firm*—Choate, Hall & Stewart

(57) ABSTRACT

In a booster circuit comprising a first pump capacitor (CP1) connected between nodes (N1, N3) and a second pump capacitor (CP2) connected between nodes (N2, N4), the booster circuit comprises first through fifth switches (S1–S5). Connected to the node (N1), the first switch (S1) is connected to one of a power-supply node, a ground node, and a booster node. Connected to the node (N2), the second switch (S2) is connected to one of the power-supply node, the ground node, and the booster node. Disposed between the nodes (N3, N4), the third switch (S3) makes or breaks. Connected to the node (N3), the fourth switch (S4) is connected to one of the power-supply node, the booster node, and a non-connective node. Connected to the node (N4), the fifth switch (N5) is connected to one of the power-supply node, the booster node, and the non-connective node.

17 Claims, 19 Drawing Sheets

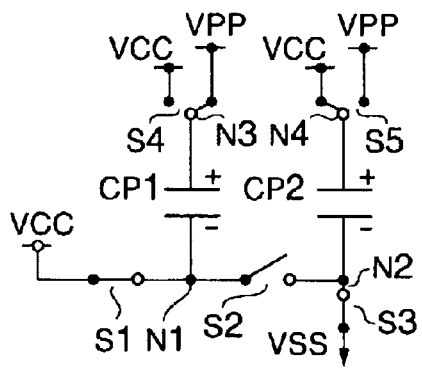
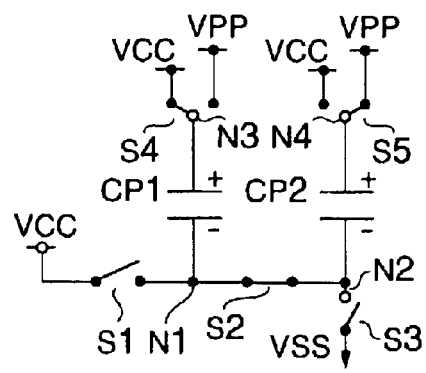
FIG. 1A      FIG. 1B
PRIOR ART    PRIOR ART
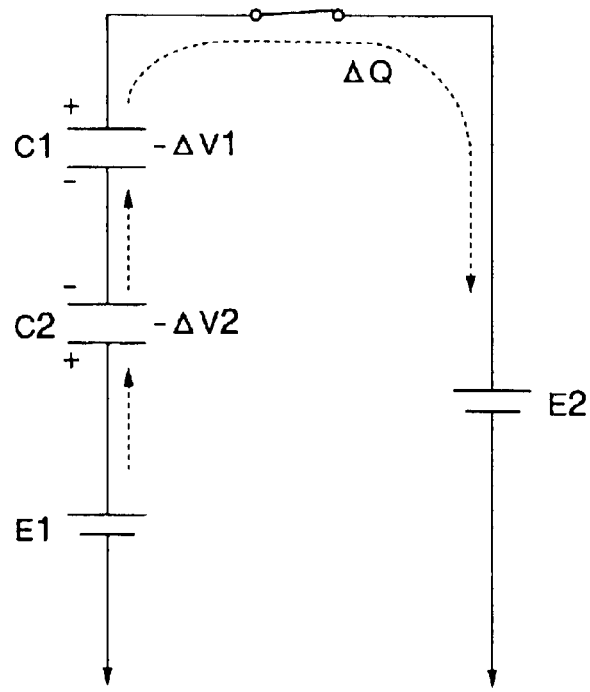
FIG. 2 PRIOR ART

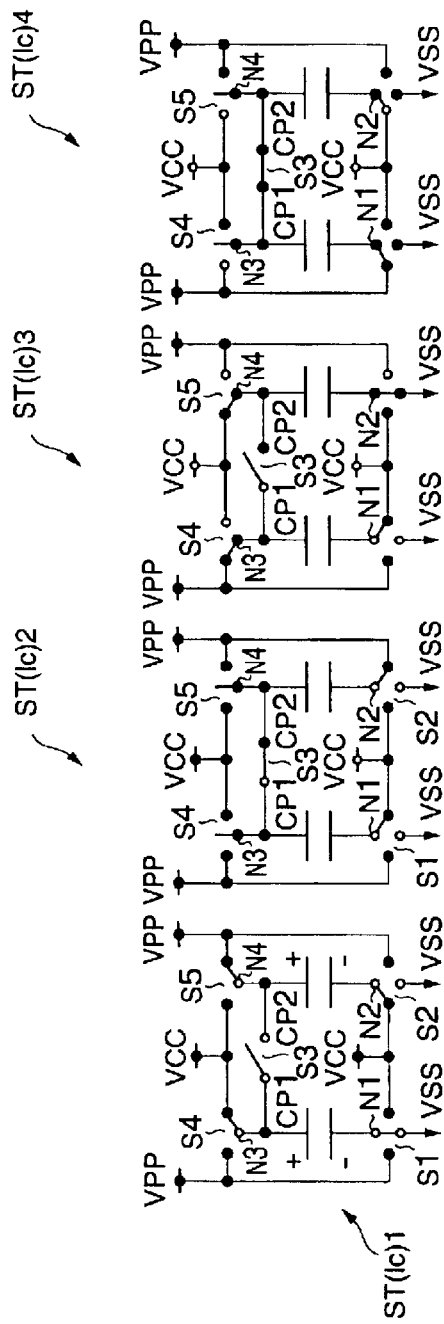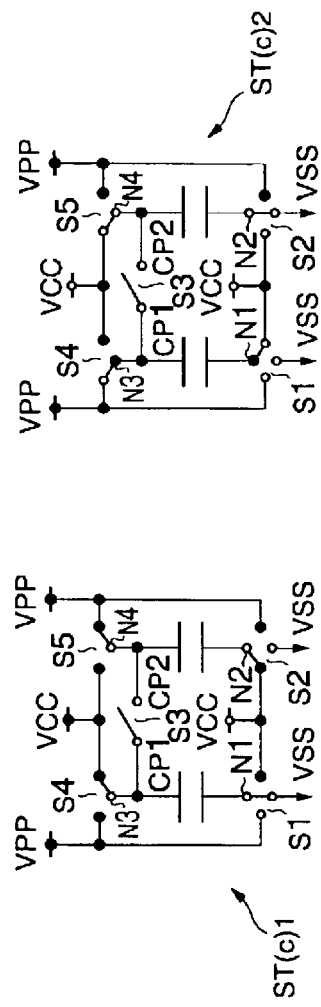
FIG. 3A  FIG. 3B  FIG. 3C  FIG. 3D
FIG. 4A  FIG. 4B

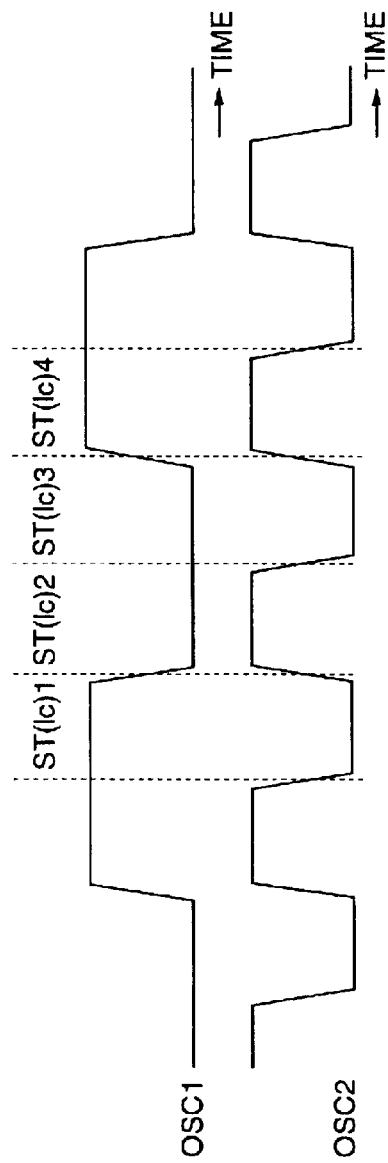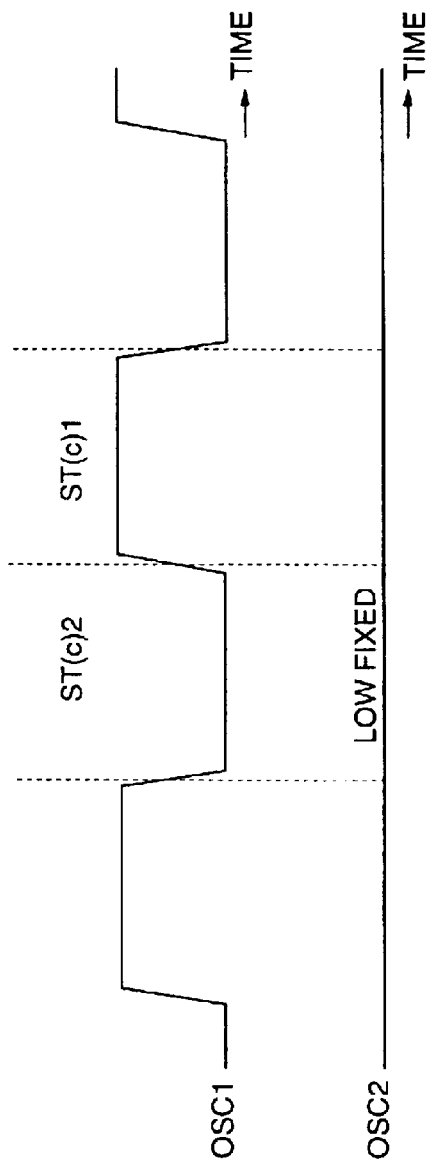

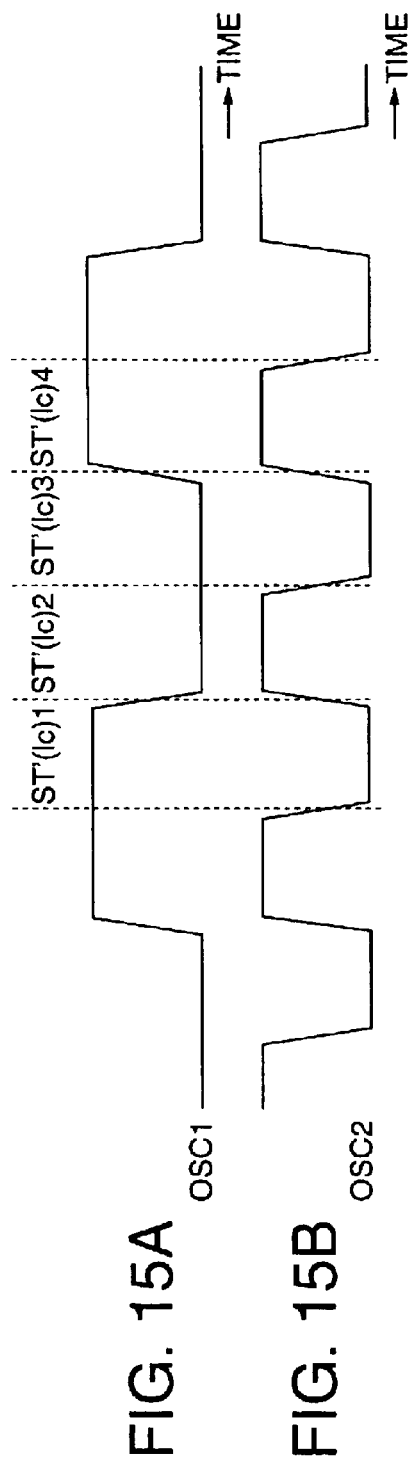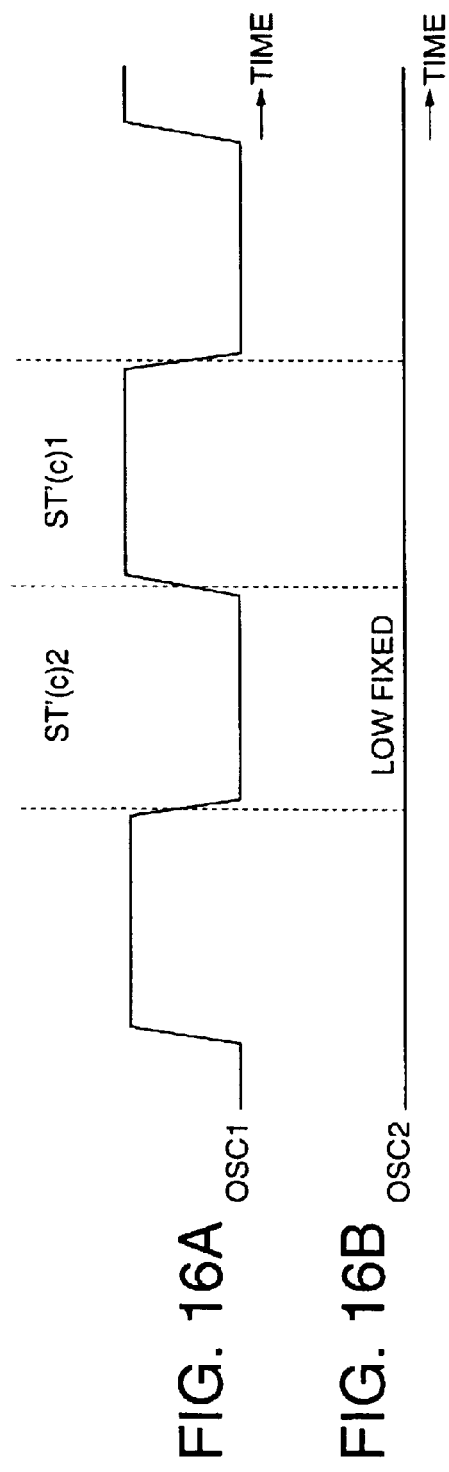

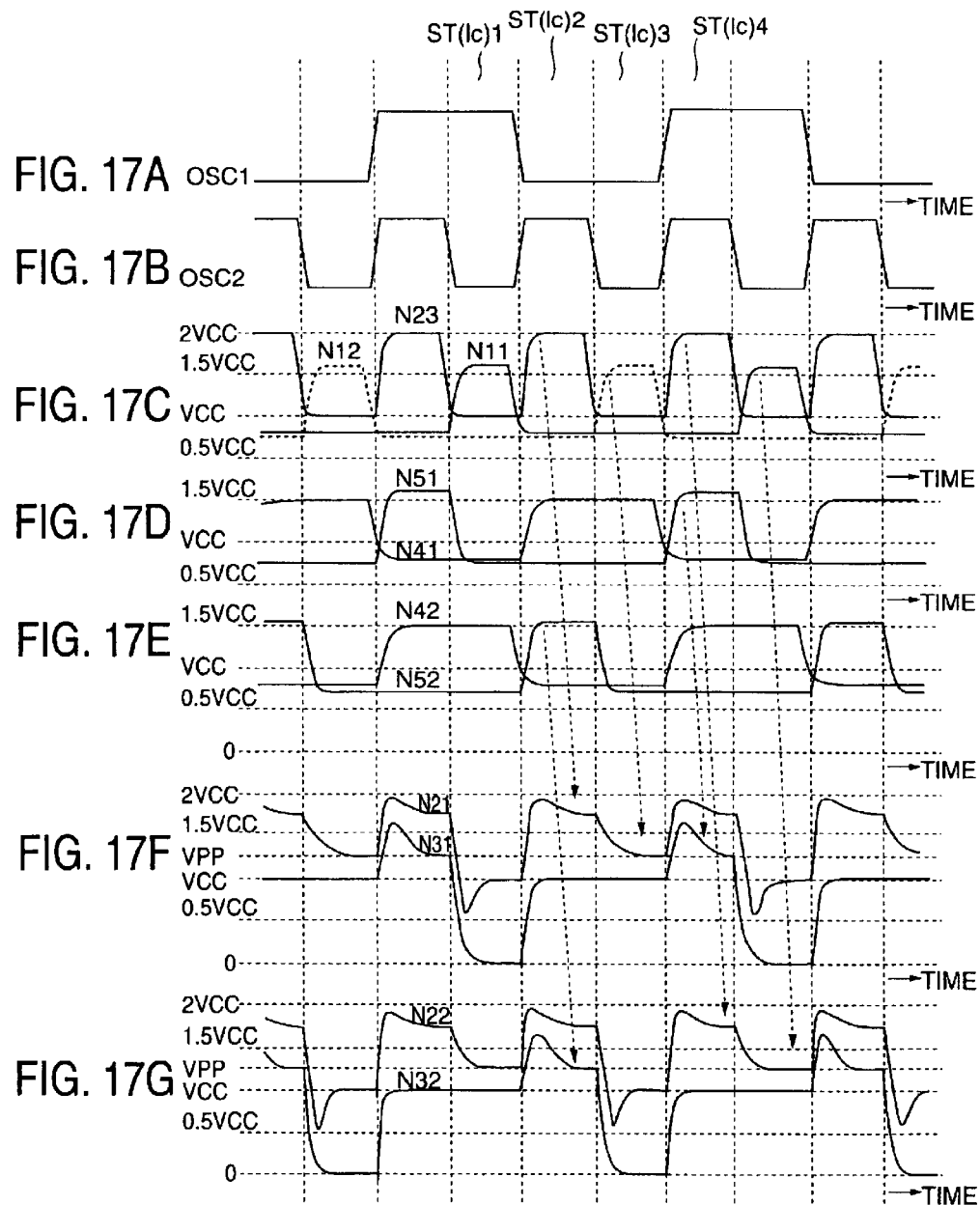

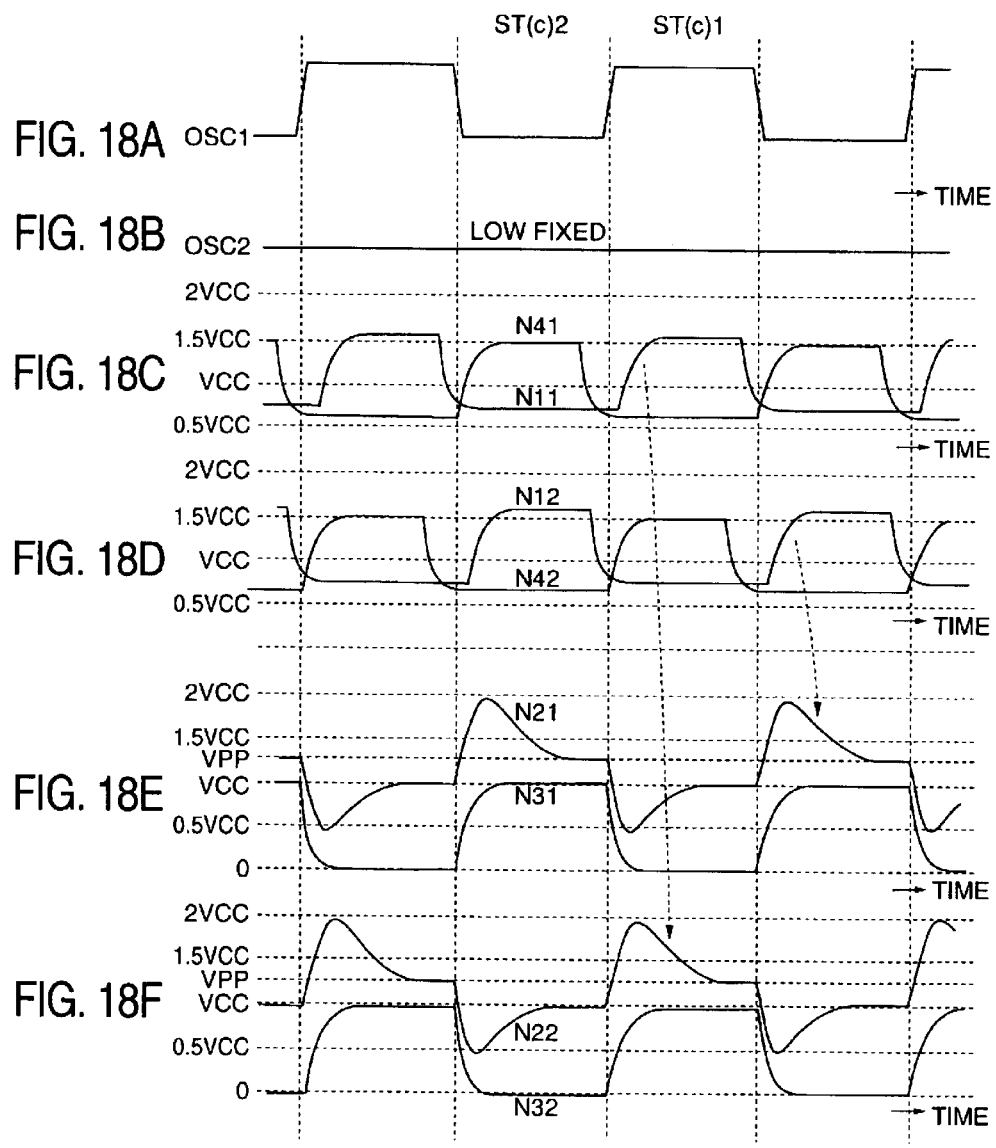

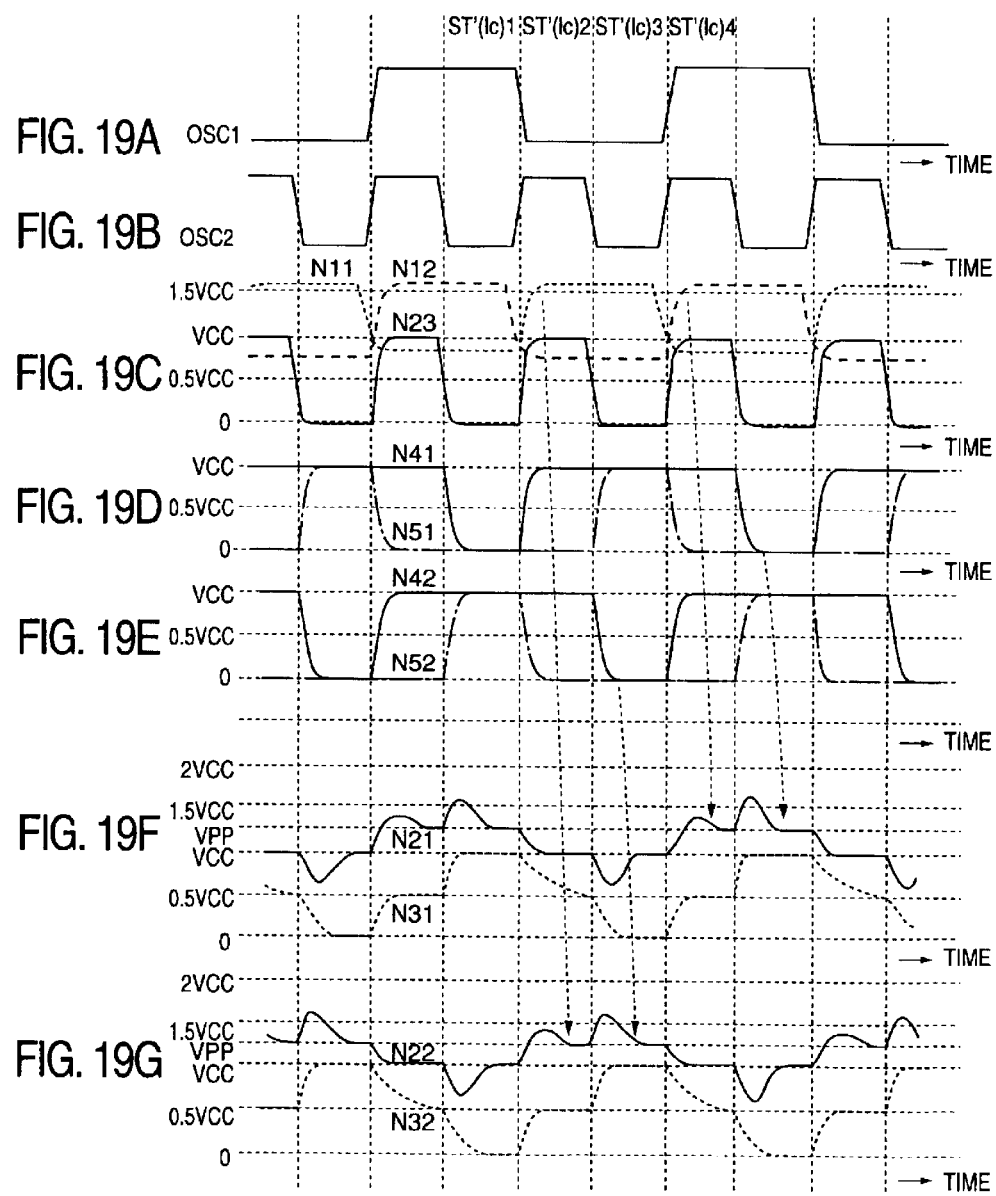

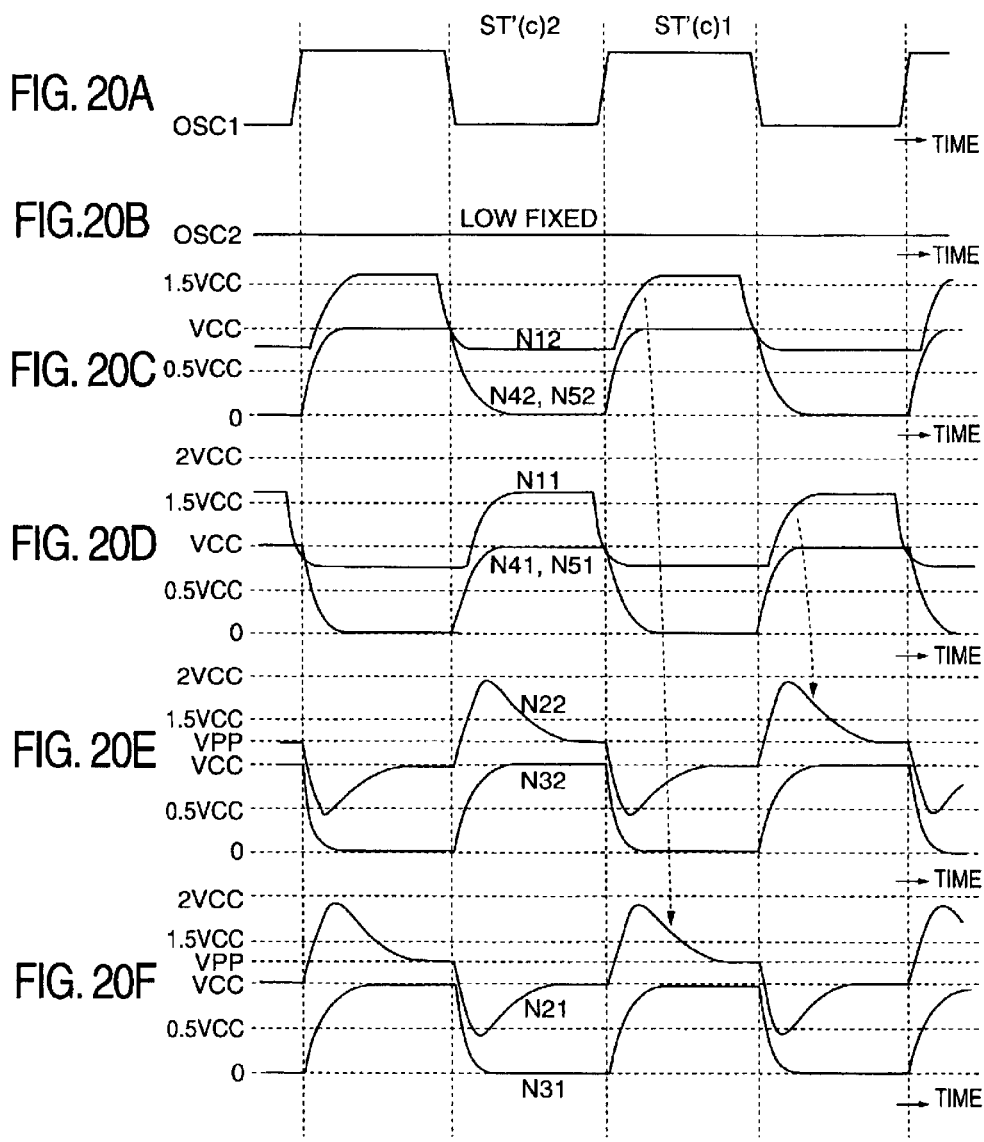

BOOSTER CIRCUIT CAPABLE OF SWITCHING BETWEEN A CONVENTIONAL MODE AND A LOW CONSUMPTION CURRENT MODE

BACKGROUND OF THE INVENTION

This invention relates to a booster circuit contained in a semiconductor device and, more particularly, to a booster circuit used as an internal power supply for a dynamic random access memories (DRAM) for use in a portable apparatus driven by an external power supply of 1.8V and a driving method thereof.

Generally, a booster circuit of the type described (which will be called hereafter "a normal pump circuit") comprises a pump capacitor, switches, and a power supply. The normal pump circuit has a current (charge) efficiency of about 50%.

In order to realize a low power consumption, a booster circuit (a pump circuit) having an improved current (charge) efficiency more than 50% is described or disclosed in Japanese Unexamined Patent Publication Tokkai No. Hei 9-231,752 or JP-A 9-231752. The booster circuit (pump circuit) disclosed in JP-A 9-231752 comprises two pump capacitors and five switches.

In the manner which will later be described in conjunction with FIGS. 1A and 1B, the booster circuit disclosed in JP-A 9-231752 comprises a first pump capacitor, a second pump capacitor, and first through fifth switches. The booster circuit is supplied with a power-supply voltage (power-supply potential) and a ground voltage (ground potential). The booster circuit produces (generates) a boosted level (boosted potential). That is, the booster circuit has a node supplied with the power-supply voltage, a node supplied with the ground voltage, and a node for generating the boosted level. The node supplied with the power-supply voltage is called a "power-supply node". The node supplied with the ground voltage is called a "ground node". The node for generating the boosted level is called a "booster node". In addition, the booster circuit has first and second input nodes and first and second intermediate nodes.

The first pump capacitor is connected between the first input node and the first intermediate node. The second pump capacitor is connected between the second input node and the second intermediate node.

The first through the third switches are connected in series between the power-supply node and the ground node. Specifically, the first switch is connected between the power-supply node and the first input node. Generally, the first switch comprises a P-channel metal oxide semiconductor (PMOS) transistor which has a source connected to the power-supply node and a drain connected to the first input node. The second switch is connected between the first input node and the second input node. Generally, the second switch comprises an N-channel metal oxide semiconductor (NMOS) transistor which has a drain connected to the first input node and a source connected to the second input node. The third switch is connected between the second input node and the ground node. Generally, the third switch comprises an NMOS transistor which has a drain connected to the second input node and a source connected to the ground node.

The fourth switch has a fixed contact fixedly connected to the first intermediate node and a moving contact which is selectively connected to either the power-supply node or the booster node. The fifth switch has a fixed contact fixedly connected to the second intermediate node and a moving contact which is selectively connected to either the power-supply node or the booster node.

The booster circuit having such structure repeats a first state and a second state to realize high efficiency of booster and a supply current. The first state is a state where the first pump capacitor discharges and the second pump capacitor is charged. On the other hand, the second state is a state where the first pump capacitor is charged and the second pump capacitor discharges.

More specifically, in the first state, the first switch is turned on or makes, the second switch is turned off or breaks, the third switch is turned on or makes, the fourth switch connects the first intermediate node with the booster node, and the fifth switch connected the second intermediate node with the power-supply node. In this state, the first pump capacitor is climbed by the power-supply voltage to supply the booster node with a current. Simultaneously, the second pump capacitor is charged by the power-supply voltage and the ground voltage.

On the other hand, in the second state, the first switch is turned off or breaks, the second switch is turned on or makes, the third switch is turned off or breaks, the fourth switch connects the first intermediate node with the power-supply node, and the fifth switch connects the second intermediate node with the booster node. In this state, the first and the second pump capacitors are connected to each other in series, the first pump capacitor is climbed by the power-supply voltage, and a current flows from the second pump capacitor to the booster node. In this event, inasmuch as the first pump capacitor has an electrode direction in the opposite direction to a booster direction, the first pump capacitor is charged with charges moved.

It is assumed that the amount of charges moving for a half cycle per capacitor is represented by $\Delta Q$. In this event, the amount of charges flowing out of the power-supply node is equal to 3 $\Delta Q$. On the other hand, the amount of charges supplied to the booster node is equal to 2 $\Delta Q$. Accordingly, the booster circuit has a current (charge) efficiency of about 66.6% or two-thirds. In comparison with the normal pump circuit having the current (charge) efficiency of about 50%, the booster circuit has an improved current (charge) efficiency about 1.33 times.

However, the above-mentioned booster circuit disclosed in JP-A 9-231752 is disadvantageous in that a voltage enable to boost is limited to 1.5 times the power-supply voltage. Therefore, a supply current drastically decreases when the boosted level approaches 1.3 times the power-supply voltage and a supply efficiency deteriorates. A ground occurring this problem will later be described in conjunction with FIG. 2.

In addition, various booster circuits except for the above-mentioned one are proposed. By way of example, WO98/44621 discloses a power-supply circuit which is capable of variably controlling a boosting ratio by means of two pump capacitors and five switches. More specifically, a power course circuit can reduce its own power consumption and can select its boosting ratio in accordance with the duty ratio. The power source circuit comprises a charge pump circuit including a first switching section which accumulates charges in a first capacitor and a second switching section which transfers the charges accumulated in the first capacitor to a second capacitor, and a circuit which generates switching signals for controlling the first and the second switching sections. The first switching section comprises first and second switching elements which are respectively connected to different potentials on one side and to one end of the first capacitor on the other side. The switching signal generating circuit variably controls the boosting rate by turning on or off the first switching element and turning off the second switching element or by turning on or off the second switching element and turning off the first switching element. The potential of the switching signal when the first and the second switching elements are turned off is made equal to the potential supplied to the source of a switching transistor. The boosting rate is controlled in accordance with the duty ratio when a liquid crystal display is operated for partial display.

U.S. Pat. No. 6,259,612 issued to Yasuo Itoh discloses a semiconductor integrated circuit having a small chip area using two pump capacitors. According to Itoh, an internal voltage generator generates an internal voltage that is obtained by up-converting or down-converting an external power supply voltage. A resistor-voltage divider, having a plurality of resistors, outputs a first divided voltage that is obtained by dividing the internal voltage according to a resistance ratio of the resistors. A capacitor-voltage divider, having a plurality of capacitors connected in series between an output terminal of the internal voltage generator and a ground level, outputs a second divided voltage from the capacitors. A comparator compares a reference voltage and the first divided voltage for controlling the internal voltage generator according to a result of comparison. The comparator judges whether to halt operation of the internal voltage generator or not based on the result of comparison between the reference voltage and the first divided voltage while the internal voltage generator is operating. On the other hand, the comparator operates the internal voltage generator based on the result of comparison between the reference voltage and the second divided voltage while the internal voltage generator is not operating. The comparator further controls the resistor-voltage divider to that a current flows therethrough only when the internal voltage generator is operating.

U.S. Pat. No. 5,774,012 issued to Heung-Soo Im discloses a high-efficient charge-pumping circuit using two pump capacitors and three switches. According to Im, a charge-pumping circuit of a semiconductor memory device generates a voltage higher than an applied supply voltage. The charge-pumping circuit includes a first MOS transistor having gate and drain terminals between through which the supply voltage is received and a source terminal through which an initial voltage is provided to a first mode. A first capacitor with predetermined capacitance has one plate connected to the first node and the other plate through which an applied first oscillating signal is received. A third MOS transistor has gate and source terminals connected to the first node to introduce the electric current of the first node into its drain terminal. A second capacitor with capacitance lower than that of the first capacitor has one plate connected to the second node that is the drain terminal of the third MOS transistor and the other plate through which an applied second oscillating signal is received. A second MOS transistor has drain and gate terminals connected to the first node and the second node, respectively, and a source terminal connected to an output terminal so as to apply the voltage of the first node to the output terminal in response to the voltage of the second node.

Japanese Unexamined Patent Publication Tokkai No. Hei 9-238,463 or JP-A 9-238463 discloses a high-efficient charge pump circuit using two pump capacitors and four switches. More specifically, this circuit comprises a reference voltage generator circuit which generates three voltage VH, V2, and V1. A saw-tooth wave generating circuit generates saw-tooth waves with the voltage VH. First and second comparators compare the voltages V1 and V2 with the saw-tooth wave output from the saw-tooth wave generating circuit and then generate control signals. Second, third, fifth and sixth transistors turn on according to the control signals of the first and the second comparators and then connect the minus sides of first and second capacitors to the power supply. First and second current supply circuit supply base current to the third and the sixth transistors according to the control signals of the first and the second comparators. With this structure, a control can be done easily.

Another example is disclosed in an article which is contributed by Takeshi Hamamoto at al. to IEEE 1996 Symposium on VLSI Circuits Digest of Technical Papers, pages 110–111, and which has a title of "An Efficient Charge Recycle and Transfer Pump Circuit for Low Operating Voltage DRAMs."

SUMMARY OF THE INVENTION

It is therefore an object of this invention to provide a booster circuit and a driving method thereof, which are capable of increasing a current supply efficiency in accordance with a boosted level with demerit in an area kept within two times.

It is another object of this invention to provide a booster circuit of the type described and a driving method thereof, which are capable of switching between a conventional mode and a low consumption current mode.

Other objects of this invention will become clear as the description proceeds.

On describing the gist of an aspect of this invention, it is possible to be understood that a booster circuit has a power-supply node supplied with a power-supply voltage, a ground node supplied with a ground voltage, a booster node for generating a booster level, first and second input nodes, and first and second intermediate nodes. The booster circuit comprises a first pump capacitor connected between the first input node and the first intermediate node and a second pump capacitor connected between the second input node and the second intermediate node.

According to a first aspect of this invention, the above-understood booster circuit comprises first through fifth switches. The first switch has a first fixed contact fixedly connected to the first input node and a first moving contact which is selectively connected to one of the power-supply node, the ground node, and the booster node. The second switch has a second fixed contact fixedly connected to the second input node and a second moving contact which is selectively connected to one of the power-supply node, the ground node, and the booster node. The third switch has a third fixed contact and a third moving contact disposed between the first and the second intermediate nodes. The third switch makes or breaks between the first and the second intermediate nodes. The fourth switch has a fourth fixed contact fixedly connected to the first intermediate node and a fourth moving contact which is selectively connected to one of the power-supply node, the booster node, and a non-connective node connected to nowhere. The fifth switch has a fifth fixed contact fixedly connected to the second intermediate node and a fifth moving contact which is selectively connected to one of the power-supply node, the booster node, and the non-connective node.

In the first aspect of this invention, a driving method drives the above-understood booster circuit at a low consumption current mode which repeatedly puts the booster circuit into first through fourth low consumption states. At the first low consumption state, the first switch connects the first input node with the ground node, the second switch connects the second input node with the power-supply node, the third switch breaks, the fourth switch connects the first intermediate node with the power-supply node, and the fifth switch connects the second intermediate node with the booster node. At the second low consumption state, the first switch connects the first input node with the power-supply node, the second switch connects the second input node with the booster node, the third switch makes, the fourth switch connects the first intermediate node with the non-connective node, and the fifth switch connects the second intermediate node with the non-connective node. At the third low consumption state, the first switch connects the first input node with the power-supply node, the second switch connects the second input node with the ground node, the third node breaks, the fourth switch connects the first intermediate node with the booster node, and the fifth switch connects the second intermediate node with the power-supply node. At the fourth low consumption state, the first switch connects the first input node with the booster node, the second switch connects the second input node with the power-supply node, the third switch makes, the fourth switch connects the first intermediate node with the non-connective node, and the fifth switch connects the second intermediate node with the non-connective node.

In the first aspect of this invention, a driving method drives the above-understood booster circuit at a conventional mode which repeatedly puts the booster circuit into first and second conventional states. At the first conventional state, the first switch connects the first input node with the ground node, the second switch connects the second input node with the power-supply node, the third switch breaks, the fourth switch connects the first intermediate node with the power-supply node, and the fifth switch connects the second intermediate node with the booster node. At the second conventional state, the first switch connects the first input node with the power-supply node, the second switch connects the second input node with the ground node, the third switch breaks, the fourth switch connects the first intermediate node with the booster node, and the fifth switch connects the second intermediate node with the power-supply node.

According to a second aspect of this invention, the above-understood booster circuit comprises a connection line and first through fourth switches. The connection line extends between the vicinity of the first input node and the vicinity of the second input node. The first switch has a first fixed contact fixedly connected to the first input node and a first moving contact which is selectively connected to one of the power-supply node, the ground node, and the connection line. The second switch has a second fixed contact fixedly connected to the second input node and a second moving contact which is selectively connected to one of the power-supply node, the ground node, and the connection line. The third switch has a third fixed contact fixedly connected to the first intermediate node and a third moving contact which is selectively connected to either the booster node or the power-supply node. The fourth switch has a fourth fixed contact fixedly connected to the second intermediate node and a fourth moving contact which is selectively connected to either the booster node or the power-supply node.

In the second aspect of this invention, a driving method drives the above-understood booster circuit at a low consumption current mode which repeatedly puts the booster circuit into first through fourth low consumption states. At the first low consumption state, the first switch connects the first input node with the power-supply node, the second switch connects the second input node with the ground node, the third switch connects the first intermediate node with the booster node, and the fourth switch connects the second intermediate node with the power-supply node. At the second low consumption state, the first switch connects the first input node with the connection line, the second switch connects the second input node with the connection line, the third switch connects the first intermediate node with the power-supply node, and the fourth switch connects the second intermediate node with the booster node. At the third low consumption state, the first switch connects the first input node with the ground node, the second switch connects the second input node with the power-supply node, the third switch connects the first intermediate node with the power-supply node, and the fourth switch connects the second intermediate node with the booster node. At the fourth low consumption state, the first switch connects the first input node with the connection line, the second switch connects the second input node with the connection line, the third switch connects the first intermediate node with the booster node, and the fourth switch connects the second intermediate node with the power-supply node.

In the second aspect of this invention, a driving method drives the above-understood booster circuit at a conventional mode which repeatedly puts the booster circuit into first and second conventional states. At the first conventional state, the first switch connects the first input node with the power-supply node, the second switch connects the second input node with the ground node, the third switch connects the first intermediate node with the booster node, and the fourth switch connects the second intermediate node with the power-supply node. At the second conventional state, the first switch connects the first input node with the ground node, the second switch connects the second input node with the power-supply node, the third switch connects the first intermediate node with the power-supply node, and the fourth switch connects the second intermediate node with the booster node.

BRIEF DESCRIPTION OF THE DRAWING

FIGS. 1A and 1B are circuit diagrams for use in describing an operating principle of a booster circuit according to prior application (JP-A 9-231752);

FIG. 2 is a circuit diagram for use in supplementary describing a boosting principle of the booster circuit illustrated in FIGS. 1A and 1B;

FIGS. 3A–3D are circuit diagrams for use in describing an operation principle at a low consumption current mode in a booster circuit according to a first embodiment of this invention;

FIGS. 4A and 4B are circuit diagrams for use in describing an operation principle at a conventional mode in the booster circuit according to the first embodiment of this invention;

FIGS. 12A and 12B are time charts showing waveforms of first and second clock signals supplied to the booster circuit illustrated in FIG. 11 on the low consumption current mode, respectively;

FIGS. 13A and 13B are time charts showing waveforms of the first and the second clock signals supplied to the booster circuit illustrated in FIG. 11 on the conventional mode, respectively;

FIGS. 15A and 15B are time charts showing waveforms of first and second clock signals supplied to the booster circuit illustrated in FIG. 14 on the low consumption current mode, respectively;

FIGS. 16A and 16B are time charts showing waveforms of the first and the second clock signals supplied to the booster circuit illustrated in FIG. 14 on the conventional mode, respectively;

FIGS. 17A through 17G are time charts showing operational waveforms at each portion on the low consumption current mode in the booster circuit illustrated in FIG. 11;

FIGS. 18A through 18F are time charts showing operational waveforms at each portion on the conventional mode in the booster circuit illustrated in FIG. 11;

FIGS. 19A through 19G are time charts showing operational waveforms at each portion on the low consumption current mode in the booster circuit illustrated in FIG. 14;

FIGS. 20A through 20F are time charts showing operational waveforms at each portion on the conventional mode in the booster circuit illustrated in FIG. 14;

DESCRIPTION OF THE PREFERRED EMBODIMENTS

Figure 5:
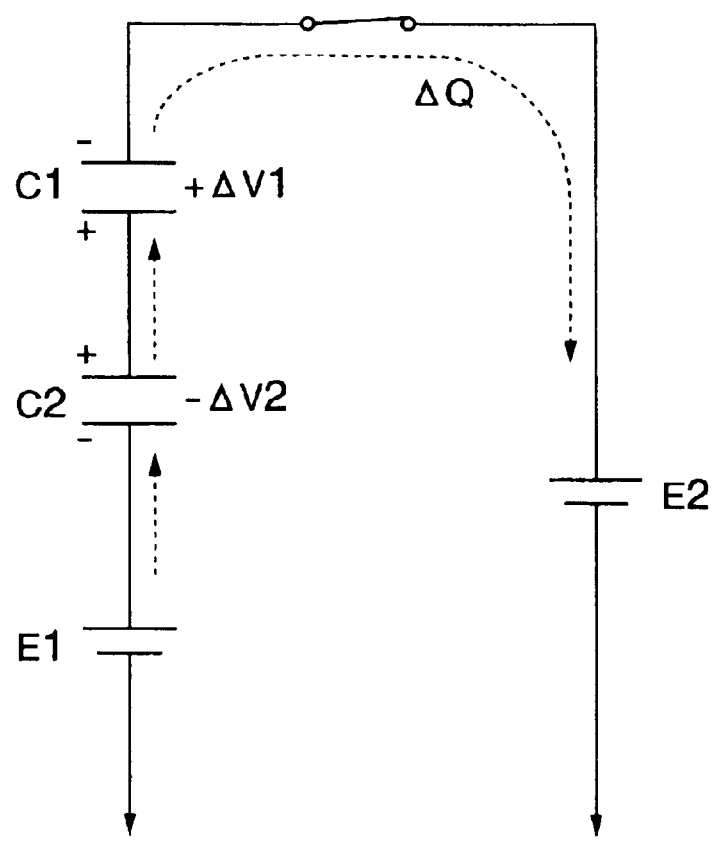
FIG. 5 is a circuit diagram for use in supplementary describing an operation principle of the booster circuit illustrated in FIGS. 3A–3D, 4A, and 4B.

Referring to FIGS. 1A and 1B, a booster circuit according to prior application will be described at first in order to facilitate an understanding of the present invention. The illustrated booster circuit is disclosed in the above-mentioned JP-A 9-23175. FIG. 1A shows a first state of the booster circuit while FIG. 1B shows a second state of the booster circuit. Throughout this specification, the same reference symbol is attached to or denotes both of a voltage and a node.

The illustrated booster circuit comprises a first pump capacitor CP1, a second pump capacitor CP2, and first through fifth switches S1, S2, S3, S4, and S5. The booster circuit is supplied with a power-supply voltage (power-supply potential) VCC and a ground voltage (ground potential) VSS. The booster circuit produces (generates) a boosted level (boosted potential) VPP. That is, the booster circuit has a node VCC supplied with the power-supply voltage VCC, a node VSS supplied with the ground voltage VSS, and a node VPP for generating the boosted level VPP. The node VCC supplied with the power-supply voltage is called a "power-supply node." The node VSS supplied with the ground voltage is called a "ground node." The node VPP for generating the boosted level is called a "booster node." In addition, the booster circuit has first and second input nodes N1 and N2 and first and second intermediate nodes N3 and N4.

The first pump capacitor CP1 is connected between the first input node N1 and the first intermediate node N3. The second pump capacitor CP2 is connected between the second input node N2 and the second intermediate node N4.

The first through the third switches S1 to S3 are connected in series between the power-supply node VCC and the ground node VSS. Specifically, the first switch S1 is connected between the power-supply node VCC and the first input node N1. Generally, the first switch S1 comprises a P-channel metal oxide semiconductor (PMOS) transistor which has a source connected to the power-supply node VCC and a drain connected to the first input node N1. The second switch S2 is connected between the first input node N1 and the second input node N2. Generally, the second switch S2 comprises an N-channel metal oxide semiconductor (NMOS) transistor which has a drain connected to the first input node N1 and a source connected to the second input node N2. The third switch S3 is connected between the second input node N2 and the ground node VSS. Generally, the third switch S3 comprises an NMOS transistor which has a drain connected to the second input node N2 and a source connected to the ground node VSS.

The fourth switch S4 has a fixed contact fixedly connected to the first intermediate node N3 and a moving contact which is selectively connected to either the power-supply node VCC or the booster node VPP. The fifth switch S5 has a fixed contact fixedly connected to the second intermediate node N4 and a moving contact which is selectively connected to either the power-supply node VCC or the booster node VPP.

The booster circuit having such structure repeats the first state and the second state, as illustrated in FIGS. 1A and 1B, to realize high efficiency of booster and a supply current. As shown in FIG. 1A, the first state is a state where the first pump capacitor CP1 discharges and the second pump capacitor CP2 is charged. As shown in FIG. 1B, the second state is a state where the first pump capacitor CP1 is charged and the second pump capacitor CP2 discharges.

More specifically, in the first state illustrated in FIG. 1A, the first switch S1 is turned on or makes, the second switch S2 is turned off or breaks, the third switch S3 is turned on or makes, the fourth switch S4 connects the first intermediate node N3 with the booster node VPP, and the fifth switch S5 connects the second intermediate node N4 with the power-supply node VCC. In this state, the first pump capacitor CP1 is climbed by the power-supply voltage VCC to supply the booster node VCC with a current. Simultaneously, the second pump capacitor CP2 is charged by the power-supply voltage VCC and the ground voltage VSS.

On the other hand, in the second state illustrated in FIG. 1B, the first switch S1 is turned off or breaks, the second switch S2 is turned on or makes, the third switch S3 is turned off or breaks, the fourth switch S4 connects the first intermediate node N3 with the power-supply node VCC, and the fifth switch S5 connects the second intermediate node N4 with the booster node VPP. In this state, the first and the second pump capacitors CP1 and CP2 are connected to each other in series, the first pump capacitor CP1 is climbed by the power-supply voltage VCC, and a current flows from the second pump capacitor CP2 to the booster node VPP. In this event, inasmuch as the first pump capacitor CP1 has an electrode direction in the opposite direction to a booster direction, the first pump capacitor CP1 is charged with charges moved.

It is assumed that the amount of charges moving for a half cycle per capacitor is represented by ΔQ. In this event, the amount of charges flowing out of the power-supply node VCC is equal to 3 ΔQ. On the other hand, the amount of charges supplied to the booster node VPP is equal to 2 ΔQ. Accordingly, the booster circuit has a current (charge) efficiency of about 66.6% or two-thirds. In comparison with the normal pump circuit having the current (charge) efficiency of about 50%, the booster circuit has an improved current (charge) efficiency about 1.33 times.

However, the above-mentioned booster circuit is disadvantageous in that a voltage enable to boost is limited to 1.5 times the power-supply voltage VCC. Therefore, a supply current drastically decreases when the boosted level VPP approaches 1.3 times the power-supply voltage VCC and a supply efficiency deteriorates.

Referring to FIG. 2, a ground occurring this problem will be described. The ground occurring this problem is for limiting a boosted voltage by making the electrode in the direction opposite to a booster direction when the first pump capacitor CP1 and the second pump capacitor CP2 are connected to each other in series, as shown in FIG. 2.

More specifically, it will be assumed that the first pump capacitor CP1 has a capacitance equal to that of the second pump capacitor CP2 and a potential where each capacitor changes on charging/discharging is equal to ΔV. In this event, a following expression is satisfied from the first state illustrated in FIG. 1A and the second state illustrated in FIG. 1B:

$$VCC+(VCC-VPP-\Delta V)+(VCC-\Delta V)=VPP.$$

By solving this expression for ΔV, a following expression is obtained:

$$\Delta V=(3/2) \blacklozenge VCC-VPP.$$

Accordingly, it is understood that a supply current becomes zero when the boosted level VPP is 1.5 times VCC. In other words, it is understood that the booster circuit disclosed in JP-A 9-231752 improves the current efficiency by controlling the boosted level VPP.

It will be assumed that voltages before and after boosting are represented by $V_1$ and $V_2$ and currents before and after boosting are represented by $I_1$ and $I_2$. Under the circumstances, from the law of the conservation of energy, a following expression is satisfied:

$$V_1 \times I_1 = V_2 \times I_2.$$

If the boosted voltage is raised, a current becomes large and then the current efficiency increases.

Referring to FIGS. 3A, 3B, 3C, 3D, 4A, and 4B, the description will proceed to an operating principle of a booster circuit according to a first embodiment of this invention. The illustrated booster circuit is operable at either a low consumption current mode illustrated in FIGS. 3A–3D or a conventional mode illustrated in FIGS. 4A and 4B. In other words, the illustrated booster circuit can operate by switching between the conventional mode and the low consumption current mode. Throughout this specification, the same reference symbol is attached to or denotes both of a voltage and a node.

Although the illustrated booster circuit requires two pump capacitors in the manner as the booster circuit disclosed in JP-A 9-231752 illustrated in FIGS. 1A and 1B, the two pump capacitors in the illustrated booster circuit are put in symmetrical relationship.

More specifically, the booster circuit comprises a first pump capacitor CP1, a second pump capacitor CP2, and first through fifth switches S1, S2, S3, S4, and S5. The booster circuit is supplied with a power-supply voltage (power-supply potential) VCC and a ground voltage (grand potential) VSS. The booster circuit produces or generates a boosted level (boosted potential). That is, the booster circuit has a node VCC supplied with the power-supply voltage VCC, a node VSS supplied with the ground voltage VSS, and a node VPP for generating the boosted level VPP. The node VCC supplied with the power-supply voltage is called a power-supply node. The node VSS supplied with the ground voltage is called a ground node. The node VPP for generating the boosted level VPP is called a booster node. In addition, the booster circuit has first and second input nodes N1 and N2 and first and second intermediate nodes N3 and N4.

The first pump capacitor CP1 is connected between the first input node N1 and the first intermediate node N3. The second pump capacitor CP2 is connected between the second input node N2 and the second intermediate node N4.

The first switch S1 has a first fixed contact fixedly connected to the first input node N1 and a first moving contact which is selectively connected to one of the power-supply node VCC, the ground node VSS, and the booster node VPP. Likewise, the second switch S2 has a second fixed contact fixedly connected to the second input node N2 and a second moving contact which is selectively connected to one of the power-supply node VCC, the ground node VSS, and the booster node VPP.

The third switch S3 has a third fixed contact and a third moving contact disposed between the first intermediate node N3 and the second intermediate node N4. The third switch S3 makes or breaks between the first intermediate node N3 and the second intermediate node N4 in the manner which will later be described.

The fourth switch S4 has a fourth fixed contact fixedly connected to the first intermediate node N3 and a fourth moving contact which is selectively connected to one of the power-supply node VCC, the booster node VPP, and a non-connective node connected to nowhere. The fifth switch S5 has a fifth fixed contact fixedly connected to the second intermediate node N4 and a fifth moving contact which is selectively connected to one of the power-supply node VCC, the booster node VPP, and the non-connective node connected to nowhere.

In the low consumption current mode illustrated in FIGS. 3A–3D, the booster circuit realizes high efficiency of a boosted current and a supply current by repeating four low consumption states, namely, a first low consumption state ST(cl)1 illustrated in FIG. 3A, a second low consumption state ST(cl)2 illustrated in FIG. 3B, a third low consumption state ST(cl)3 illustrated in FIG. 3C, and a fourth low consumption state ST(cl)4 illustrated in FIG. 3D.

In the low consumption current mode illustrated in FIGS. 3A–3D, the first low consumption state ST(cl)1 illustrated in FIG. 3A is a state where the first pump capacitor CP1 is charged and the second pump capacitor CP2 discharges, the second low consumption state ST(cl)2 illustrated in FIG. 3B is a state where the first pump capacitor CP1 discharges and the second pump capacitor CP2 is charged, the third low consumption state ST(cl)3 illustrated in FIG. 3C is a state where the first pump capacitor CP1 discharges and the second pump capacitor CP2 is charged, and the fourth low consumption state ST(cl)4 illustrated in FIG. 3D is a state where the first pump capacitor CP1 is charged and the second pump capacitor CP2 discharges.

More specifically, in the first low consumption state ST(cl)1 illustrated in FIG. 3A, the first switch S1 connects the first input node N1 with the ground node VSS, the second switch S2 connects the second input node N2 with the power-supply node VCC, the third switch S3 is turned off or breaks, the fourth switch S4 connects the first intermediate node N3 with the power-supply node VCC, and the fifth switch S5 connects the second intermediate node N4 with the booster node VPP. In this state, the first pump capacitor CP1 is charged by the power-supply voltage VCC and the ground voltage VSS while the second pump capacitor CP2 is climbed by the power-supply voltage VCC to supply a current to the booster node VPP.

In the second low consumption state ST(lc)2 illustrated in FIG. 3B, the first switch S1 connects the first input node N1 with the power-supply node VCC, the second switch S2 connects the second input node N2 with the booster node VPP, the third switch S3 is turned on or makes, the fourth switch S4 connects the first intermediate node N3 with the non-connective node, and the fifth switch S5 connects the second intermediate node N4 with the non-connective node. In this state, the fist pump capacitor CP1 and the second pump capacitor CP2 are connected to each other in series, the first pump capacitor CP1 is climbed by the power-supply voltage VCC, and a current is supplied from the second pump capacitor CP2 to the booster node VPP. In this event, the first pump capacitor CP1 discharges while the second pump capacitor CP2 is charged.

In the third low consumption state ST(cl)3 illustrated in FIG. 3C, the first switch S1 connects the first input node N1 with the power-supply node VCC, the second switch S2 connects the second input node N2 with the ground node VSS, the third switch S3 is turned off or breaks, the fourth switch S4 connects the first intermediate node N3 with the booster node VPP, and the fifth switch S5 connects the second intermediate node N4 with the power-supply node VCC. In this state, the first pump capacitor CP1 is climbed by the power-supply voltage VCC to supply a current to the booster node VPP while the second pump capacitor CP2 is charged by the power-supply voltage VCC and the ground voltage VSS.

In the fourth low consumption state ST(cl)4 illustrated in FIG. 3D, the first switch S1 connects the first input node N1 with the booster node VPP, the second switch S2 connects the second input node N2 with the power-supply node VCC, the third switch S3 is turned on or makes, the fourth switch S4 connects the first intermediate node N3 with the non-connective node, and the fifth switch S5 connects the second intermediate node N4 with the non-connective node. In this state, the first pump capacitor CP1 and the second pump capacitor CP2 are connected to each other in series, the second pump capacitor CP2 is climbed by the power-supply voltage VCC, and a current is supplied from the first pump capacitor CP1 to the booster node VPP. In this event, the first pump capacitor CP1 is charged while the second pump capacitor CP2 discharges.

The conventional mode illustrated in FIGS. 4A and 4B corresponds to that obtained by thinning the second low consumption state ST(cl)2 illustrated in FIG. 3B and the fourth low consumption state ST(cl)4 illustrated in FIG. 3D from the low consumption current mode. More specifically, the conventional mode repeats a first conventional state ST(c)1 illustrated in FIG. 4A and a second conventional state ST(c)2 illustrated in FIG. 4B. The first conventional state ST(c)1 of the conventional mode illustrated in FIG. 4A is identical with the first low consumption state ST(cl)1 of the low consumption current mode illustrated in FIG. 3A while the second conventional state ST(c)2 of the conventional mode illustrated in FIG. 4B is identical with the third low consumption state ST(cl)3 of the low consumption current mode illustrated in FIG. 3C. That is, by thinning the second and the fourth low consumption states ST(cl)2 and ST(cl)4 illustrated in FIGS. 3B and 3D from the low consumption current mode, the booster circuit switches to a booster operation in a conventional method.

FIG. 5 is a view for supplementary explanation of a booster principle in a high current efficient booster circuit illustrated in FIGS. 3A–3D. In FIG. 5, a symbol of C1 represents a capacitance value of the first pump capacitor CP1 and a symbol of C2 represents a capacitance value of the second pump capacitor CP2.

Referring to FIGS. 6A, 6B, 6C, 6D, 7A, and 7B, the description will proceed to an operating principle of a booster circuit according to a second embodiment of this invention. The illustrated booster circuit is operable at either a low consumption current mode illustrated in FIGS. 6A–6D or a conventional mode illustrated in FIGS. 7A and 7B. In other words, the illustrated booster circuit can operate by switching between the conventional mode and the low consumption current mode. Throughout this specification, the same reference symbol is attached to or denotes both of a voltage and a node.

Although the illustrated booster circuit requires two pump capacitors in the manner as the booster circuit disclosed in JP-A 9-231752 illustrated in FIGS. 1A and 1B, the two pump capacitors in the illustrated booster circuit are put in symmetrical relationship.

More specifically, the booster circuit comprises a first pump capacitor CP1, a second pump capacitor CP2, and first through fourth switches S1, S2, S3, and S4. The booster circuit is supplied with a power-supply voltage (power-supply potential) and a ground voltage (ground potential). The booster circuit produces or generates a boosted level (boosted potential). That is, the booster circuit has a node VCC supplied with the power-supply voltage VCC, a node VSS supplied with the ground voltage VSS, and a node VPP for generating the boosted level VPP. The node VCC supplied with the power-supply voltage VCC is called a power-supply node. The node VSS supplied with the ground voltage VSS is called a ground node. The node VPP for generating the boosted level VPP is called a booster node. In addition, the booster circuit has first and second input nodes N1 and N2, first and second intermediate nodes N3 and N4, and a connection line (a same potential or equipotential line) CL. The connection line CL extends between the vicinity of the first input node N1 and the vicinity of the second input node N2.

The first pump capacitor CP1 is connected between the first input node N1 and the first intermediate node N3. The second pump capacitor CP2 is connected between the second input node N2 and the second intermediate node N4.

The first switch S1 has a first fixed contact fixedly connected to the first input node N1 and a first moving contact which is selectively connected to one of the power-supply node VCC, the ground node VSS, and the connection line CL. Similarly, the second switch S2 has a second fixed contact fixedly connected to the second input node N2 and a second moving contact which is selectively connected to one of the power-supply node VCC, the ground node VSS, and the connection line CL.

The third switch S3 has a third fixed contact fixedly connected to the first intermediate node N3 and a third moving contact which is selectively connected to either the power-supply node VCC or the booster node VPP. The fourth switch S4 has a fourth fixed contact fixedly connected to the second intermediate node N4 and a fourth moving contact which is selectively connected to either the power-supply node VCC or the booster node VPP.

Figure 6A:
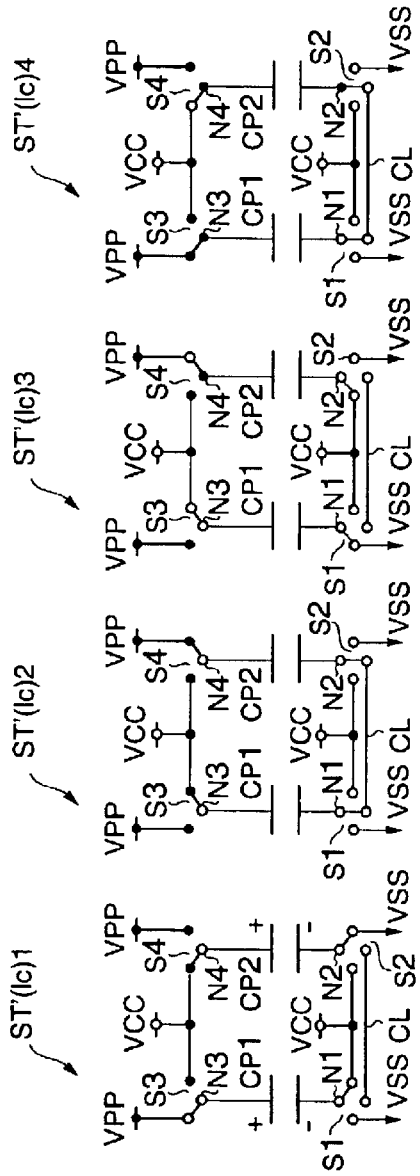
FIGS. 6A–6D are circuit diagrams for use in describing an operation principle at a low consumption current mode in a booster circuit according to a second embodiment of this invention.
Figure 6B:
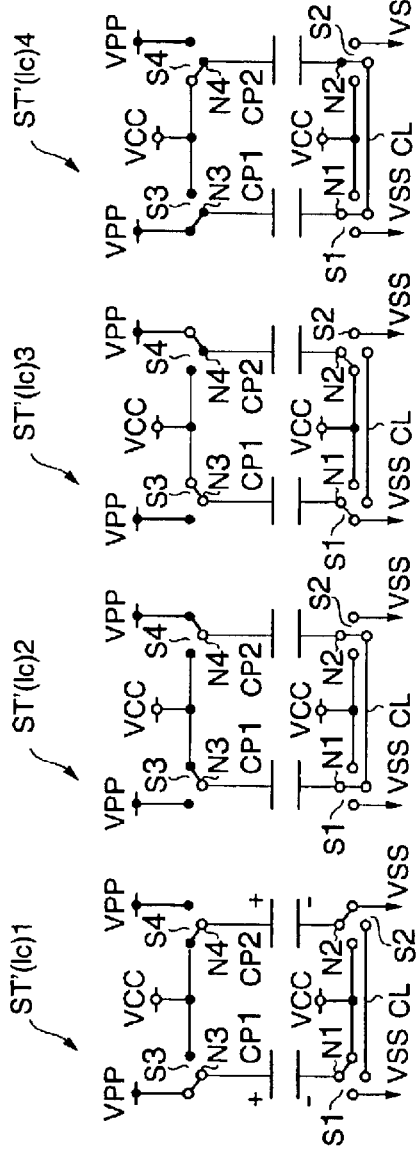
Figure 6C:
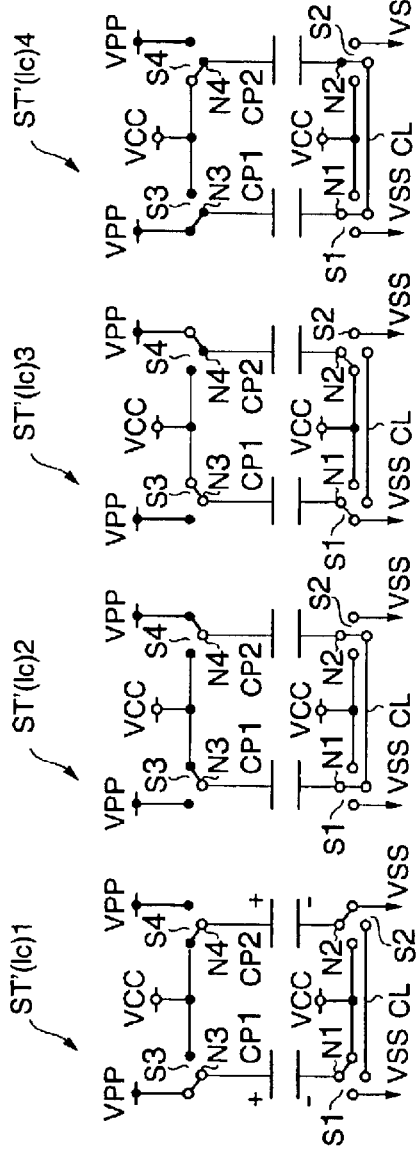
Figure 6D:
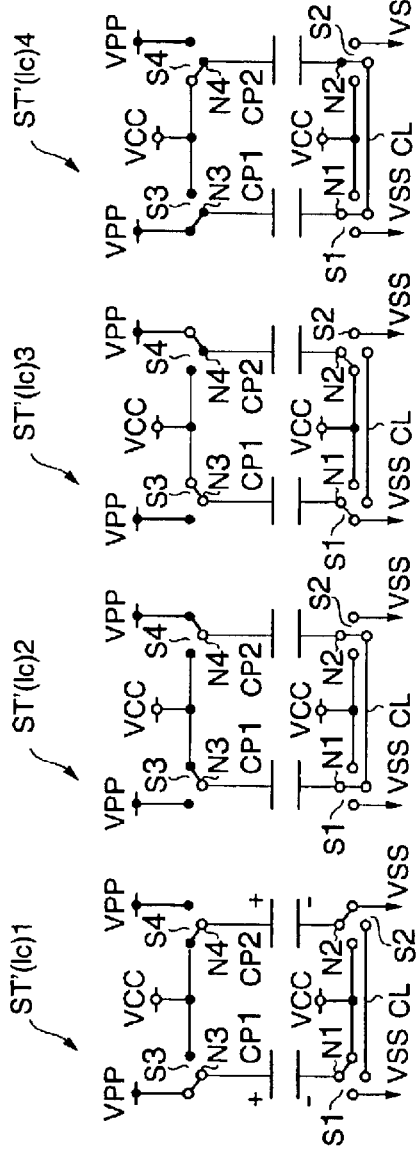

In the low consumption current mode illustrated in FIGS. 6A–6D, the booster circuit realizes high efficiency of a boosted current and a supply current by repeating four low consumption states, namely, a first low consumption state ST'(cl)1 illustrated in FIG. 6A, a second low consumption state ST'(cl)2 illustrated in FIG. 6B, a third low consumption state ST'(cl)3 illustrated in FIG. 6C, and a fourth low consumption state ST'(cl)4 illustrated in FIG. 6D.

In the low consumption current mode illustrated in FIGS. 6A–6D, the first low consumption state ST'(cl)1 illustrated in FIG. 6A is a state where the first pump capacitor CP1 discharges and the second pump CP2 is charged, the second low consumption state ST'(cl)2 illustrated in FIG. 6B is a state where the first pump capacitor CP1 is charged and the second pump capacitor CP2 discharges, the third low consumption state ST'(cl)3 illustrated in FIG. 6C is a state where the first pump capacitor CP1 is charged and the second pump capacitor CP2 discharges, and the fourth low consumption state ST'(cl)4 illustrated in FIG. 6D is a state where the first pump capacitor CP1 discharges and the second pump capacitor CP2 is charged.

More specifically, in the first low consumption state ST'(cl)1 illustrated in FIG. 6A, the first switch S1 connects the first input node N1 with the power-supply node VCC, the second switch S2 connects the second input node N2 with the ground node VSS, the third switch S3 connects the first intermediate node N3 with the booster node VPP, and the fourth switch S4 connects the second intermediate node N4 with the power-supply node VCC. In this state, the first pump capacitor CP1 is climbed by the power-supply voltage VCC to supply a current to the booster node VPP while the second pump capacitor CP2 is discharged by the power-supply voltage VCC and the ground voltage VSS.

In the second low consumption state ST'(cl)2 illustrated in FIG. 6B, the first switch S1 connects the first input node N1 with the connection line CL, the second switch S2 connects the second input node N2 with the connection line CL, the third switch S3 connects the first intermediate node N3 with the power-supply node VCC, and the fourth intermediate node N4 with the booster node VPP. In this state, the first pump capacitor CP1 and the second pump capacitor CP2 are connected to each other in series, the first pump capacitor CP1 is climbed by the power-supply voltage VCC, and a current is supplied from the second pump capacitor CP2 to the booster node VPP. In this event, the first pump capacitor CP1 is charged while the second pump capacitor CP2 discharges.

In the third low consumption state ST'(cl)3 illustrated in FIG. 6C, the first switch S1 connects the first input node N1 with the ground node VSS, the second switch S2 connects the second input node N2 with the power-supply node VCC, the third switch S3 connects the first intermediate node N3 with the power-supply node VCC, and the fourth switch S4 connects the second intermediate node N4 with the booster node VPP. In this state, the first pump capacitor CP1 is discharged by the power-supply voltage VCC and the ground voltage VSS while the second pump capacitor CP2 is climbed by the power-supply voltage VCC to supply the booster node VPP with a current.

In the fourth low consumption state ST'(cl)4 illustrated in FIG. 6D, the first switch S1 connects the first input node N1 with the connection line CL, the second switch S2 connects the second input node N2 with the connection line CL, the third switch S3 connects the first intermediate node N3 with the booster node VPP, and the fourth switch S4 connects the second intermediate node N4 with the power-supply node VCC. In this state, the first pump capacitor CP1 and the second pump capacitor CP2 are connected to each other in series, the second pump capacitor CP2 is climbed by the power-supply voltage VCC, and a current is supplied from the first pump capacitor CP1 to the booster node VPP. In this event, the first pump capacitor CP1 discharges while the second pump capacitor CP2 is charged.

Figure 7A:
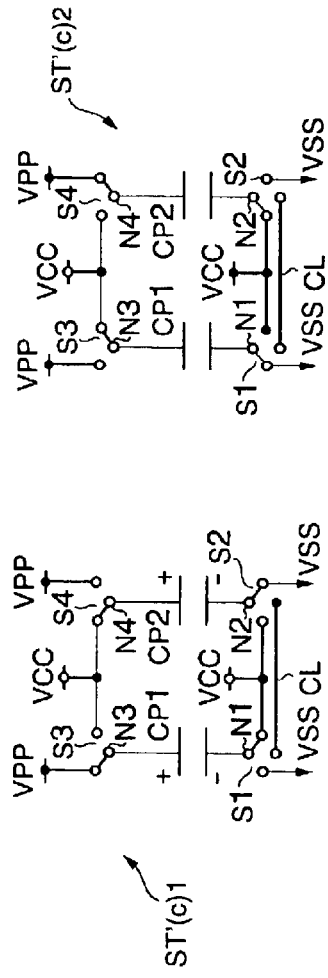
FIGS. 7A and 7B are circuit diagrams for use in describing an operation principle at a conventional mode in the booster circuit according to the second embodiment of this invention.
Figure 7B:
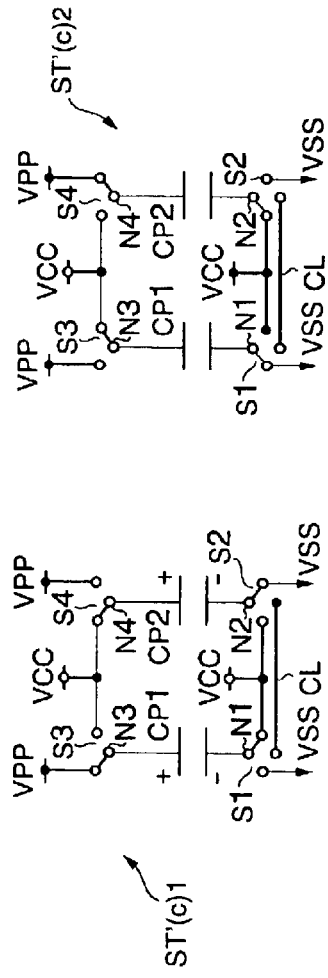

The conventional mode illustrated in FIGS. 7A and 7B corresponds to that obtained by thinning the second low consumption state ST'(cl)2 illustrated in FIG. 6B and the fourth low consumption state ST'(cl)4 illustrated in FIG. 6D from the low consumption current mode. More specifically, the conventional mode repeats a first conventional state ST'(c)1 illustrated in FIG. 7A and a second conventional state ST'(c)2 illustrated in FIG. 7B. The first conventional state ST'(c)1 of the conventional mode illustrated in FIG. 7A is identical with the first low consumption state ST'(cl)1 of the low consumption current mode illustrated in FIG. 6A while the second conventional state ST'(c)2 of the conventional mode illustrated in FIG. 7B is identical with the third low consumption state ST'(lc)3 of the low consumption current mode illustrated in FIG. 6C. That is, by thinning the second and the fourth low consumption states ST'(cl)2 and ST'(cl)4 illustrated in FIGS. 6B and 6D from the low consumption current mode, the booster circuit switches to a booster operation in a conventional method.

Figure 8:
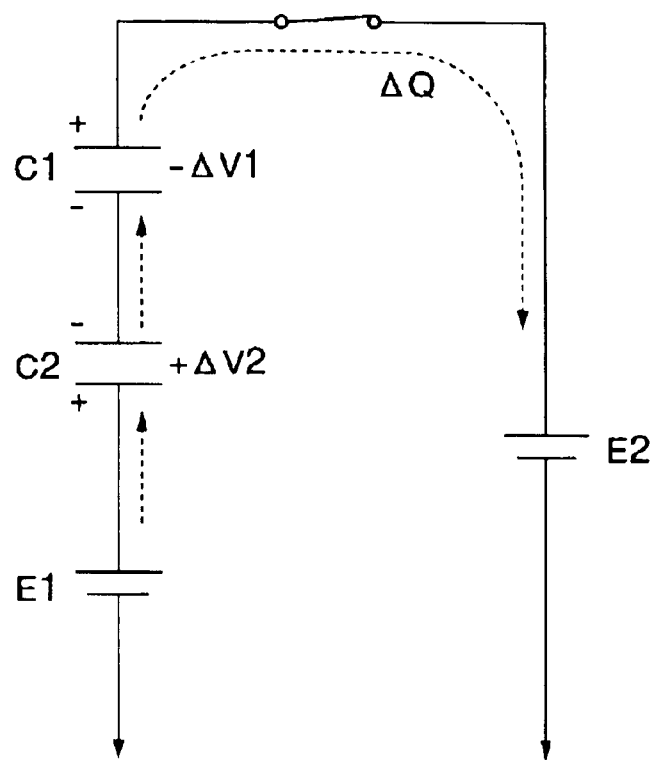
FIG. 8 is a circuit diagram for use in supplementary describing an operation principle of the booster circuit illustrated in FIGS. 6A–6D, 7A, and 7B.

FIG. 8 is a view for supplementary explanation of a booster principle in a high current efficient booster circuit illustrated in FIGS. 6A–6D. In FIG. 8, a symbol of C1 represents a capacitance value of the first pump capacitor CP1 and a symbol of C2 represents a capacitance value of the second pump capacitor CP2.

In the manner which is described above, the booster circuit according to this invention repeats to total four cycles consisting of two cycles for charging and two cycles for discharging. With this structure, it is possible to raise the current supply efficiency in accordance with the boosted level with demerit in an area limited to twice. In addition, it is possible to switch between the conventional mode and the low consumption current mode.

Figure 9:
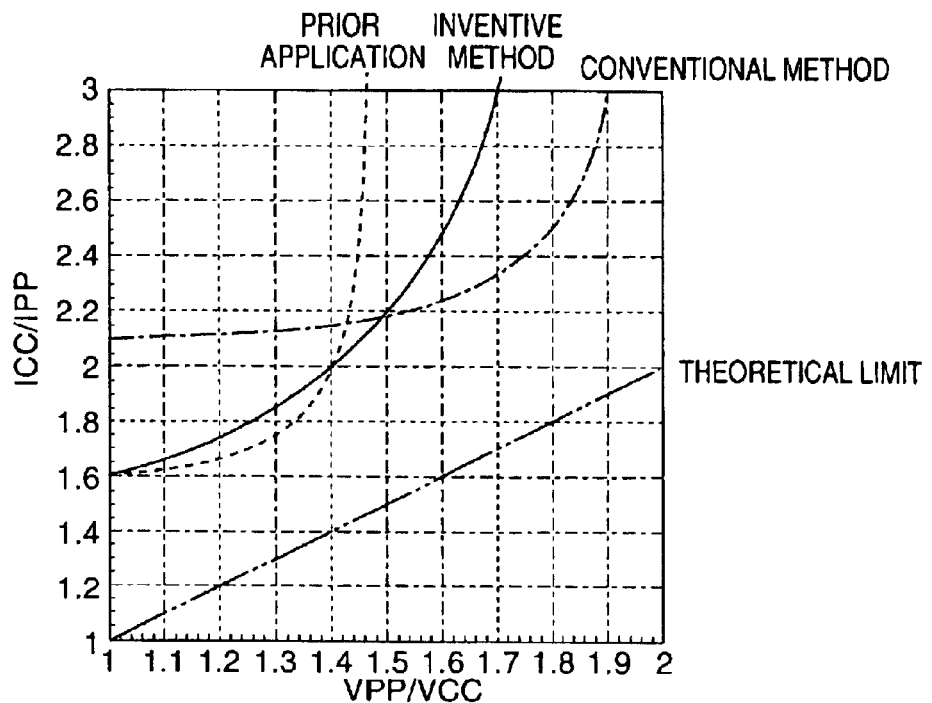
FIG. 9 shows characteristics of current efficiencies in a booster circuit according to this invention, a conventional booster circuit, and a booster circuit related to a prior application (JP-A 9-231752)
Figure 10:
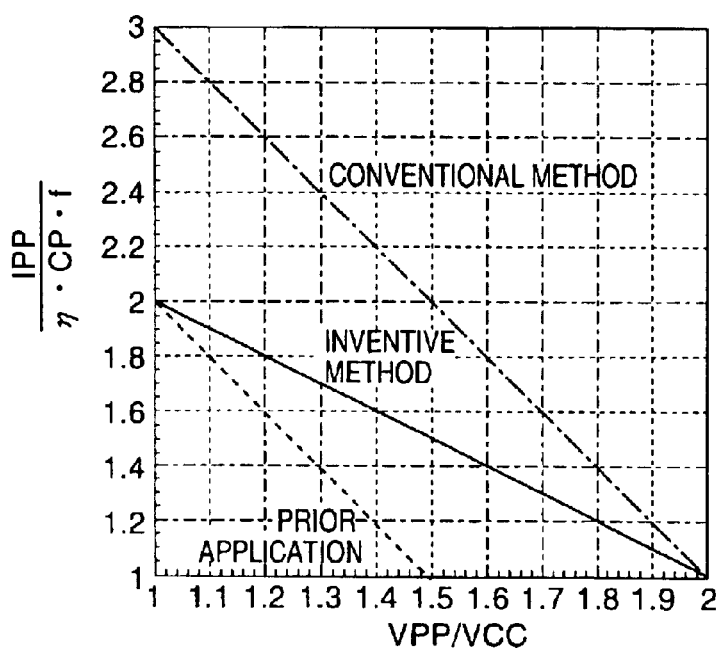
FIG. 10 illustrates characteristics of supply currents in the booster circuit according to this invention, the conventional booster circuit, and the booster circuit related to the prior application (JP-A 90231752)

FIG. 9 shows characteristics of current efficiencies in a booster circuit according to this invention, a conventional booster circuit, and a booster circuit related to a prior application. In addition, FIG. 10 illustrates characteristics of supply currents in the booster circuit according to this invention, the conventional booster circuit, and the booster circuit related to the prior application. In FIGS. 9 and 10, "inventive method" shows a characteristic of the booster circuit according to this invention (FIGS. 3A–3D or FIGS. 6A–6D), "conventional method" shows a characteristic of the above-mentioned normal pump circuit having only one pump capacitor, and "prior application" shows a characteristic of the booster circuit disclosed in JP-A 9-231752 (FIGS. 1A and 1B).

In FIG. 9, the abscissa represents VPP/VCC and the ordinate represents ICC/IPP. ICC represents a current (consumed current) for flowing from the power-supply node VCC in the booster circuit while IPP represents a current (supply current) for flowing from the booster circuit out the booster node VPP. In FIG. 10, the abscissa represents VPP/VCC and the ordinate represents IPP/η·CP·f. η represents an efficiency of a power-supply circuit, CP represents a pump capacitance, and f represents an operating frequency of the booster circuit. Herein, calculation is made assuming that the consumed current except for charging/discharging of the pump capacitance is equal to 10% of charging/discharging of the pump capacitance.

As apparent from FIG. 9, the inventive method can improve efficiency of the supply current IPP of the booster power supply at a low are of the boosted level VPP (or a small area of VPP/VCC) in comparison with the conventional method although the inventive method is worse than the prior application by a little in regard to the current efficiency. For example, when the boosted level VPP is 1.3 times VCC, the consumed current ICC in the conventional method is about 2.2 times the supply current IPP while the consumed current ICC in the inventive method is limited to about 1.8 times the supply current IPP. The current efficiency in the prior application drastically decreases when the boosted level VPP becomes high while the current efficiency in the inventive method does not drastically decrease. Accordingly, degradation in an area efficiency of the power supply circuit in the inventive method is restrained to about twice that in the conventional method ("conventional method" in FIG. 10).

Although the consumed current IPP in the prior application is restrained at the low region of the boosted level VPP in the similar manner as that in the inventive method, the prior application requires a large circuit area (which is almost occupied by the pump capacitor) because the amount of the current supply is small as shown in FIG. 10. For example, when the boosted level VPP is 1.3 times VCC, the prior application requires the circuit area which is 3.5 times that of conventional method while the circuit area in the inventive method dispenses within twice that in the conventional method.

Figure 11:
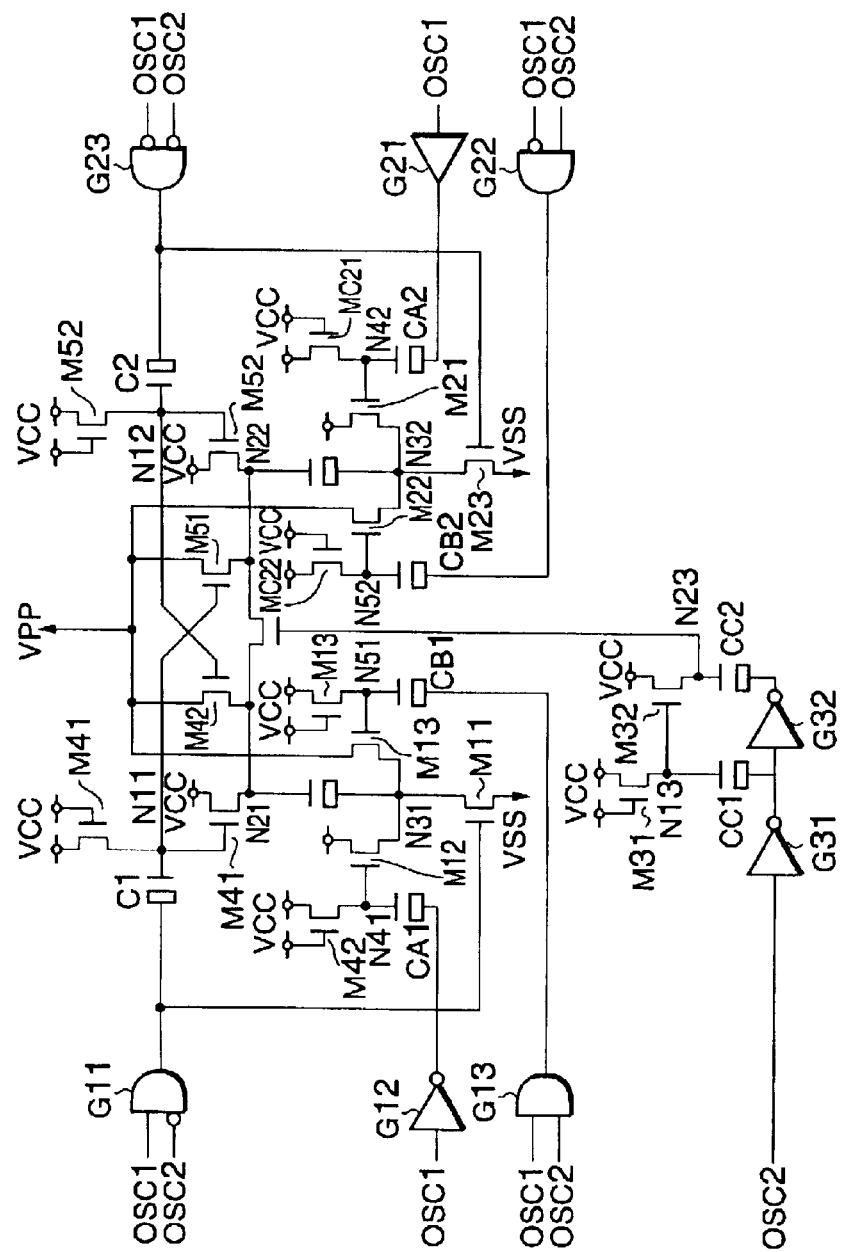
FIG. 11 is a circuit diagram of an example of the booster circuit illustrated in FIGS. 3A–3D, 4A, and 4B.

Referring to FIG. 11, the description will proceed to an example of the booster circuit illustrated in FIGS. 3A–3D, 4A, and 4B. The description will be made as regards a corresponding relationship between components in illustrated FIG. 11 and components illustrated in FIGS. 3A–3D, 4A, and 4B.

A combination of first through third primary NMOS transistors M11, M12, and M13 corresponds to the first switch S1. A combination of first through third secondary NMOS transistors M21, M22, and M23 corresponds to the second switch S2. A ternary NMOS transistor M3 corresponds to the third switch S3. A combination of first and second quaternary NMOS transistors M41 and M42 corresponds to the fourth switch S4. A combination of first and second quinary switch NMOS transistors M51 and M52 corresponds to the fifth switch S5.

A first ternary node N31 corresponds to the first input node N1 while a second ternary node N32 corresponds to the second input node N2. A first secondary node N21 corresponds to the first intermediate node N3 while a second secondary node N22 corresponds to the second intermediate node N4.

Other circuit elements constitute switch driving circuits for driving the first through the fifth switches S1 to S5.

More specifically, a first inhibit gate G11 serves as a switch driving circuit for driving the first primary NMOS transistor M11 of the first switch S1 in response to first and second clock signals OSC1 and OSC2. A combination of a first inverter G12 supplied with the first clock signal OSC1, a capacitor CA1, and a control NMOS transistor MC12 serves as a switch driving circuit for driving the second primary NMOS transistor M12 of the first switch S1. A combination of an AND gate G13 supplied with the first and the second clock signals OSC1 and OSC2, a capacitor CB1, and a control NMOS transistor MC13 serves as a switch driving circuit for driving the third primary NMOS transistor M13 of the first switch S1.

A combination of a buffer gate G12 supplied with the first clock signals OSC1, a capacitor A2, and a control NMOS transistor MC21 serves as a switch driving circuit for driving the first secondary NMOS transistor N21 of the second switch S2. A combination of a second inhibit gate G22 supplied with the first and the second clock signals OSC1 and OSC2, a capacitor CB2, and a control NMOS transistor MC23 serves as a switch driving circuit for driving the second secondary NMOS transistor M22 of the second switch S2. A NOR gate G23 acts as a switch driving circuit for driving the third secondary NMOS transistor M23 of the second switch S2 in response to the first and the second clock signals OSC1 and OSC2.

A combination of a first inverter G31 supplied with the second clock signal OSC2, a second inverter G32, capacitors CC1, CC2, and control NMOS transistors MC31, MC32 is operable as a switch driving circuit for driving the ternary NMOS transistor M3 acting as the third switch S3.

A combination of the above-mentioned first inhibit gate G11, a capacitor C1, and a control NMOS transistor MC41 serves not only as a switch driving circuit for driving the first quaternary NMOS transistor M41 of the fourth switch S4 but also as a switch driving circuit for driving the first quinary NMOS transistor M51 of the fifth switch S5. In addition, a combination of the above-mentioned NOR gate G23, a capacitor C2, and a control NMOS transistor MC52 is operable not only as a switch driving circuit for driving the second quaternary NMOS transistor MC52 of the fourth switch S4 but also as a switch circuit for driving the second quinary NMOS transistor M52 of the fifth switch S5.

FIGS. 12A, 12B, 13A, and 13B are views showing waveforms of the first and the second clock signals OSC1 and OSC2. FIGS. 12A and 12B show the waveforms of the first and the second clock signals OSC1 and OSC2 on the low consumption current mode, respectively, while FIGS. 13A and 13B show the waveforms of the first and the second clock signals OSC1 and OSC2 on the conventional mode, respectively.

Attention will be directed to the low consumption current mode shown in FIGS. 12A and 12B. When the first clock signal OSC1 has a logic high level and the second clock signal OSC2 has a logic low level, the booster circuit is put into the first low consumption state ST(lc)1 illustrated in FIG. 3A. When the first clock signal OSC1 has the logic low level and the second clock signal OSC2 has the logic high level, the booster circuit is put into the second low consumption state ST(lc)2 illustrated in FIG. 3B. When both of the first and the second clock signals OSC1 and OSC2 have the logic low level, the booster circuit is put into the third low consumption state ST(lc)3 illustrated in FIG. 3C. When both of the first and the second clock signals OSC1 and OSC2 have the logic high level, the booster circuit is put into the fourth low consumption state ST(lc)4 illustrated in FIG. 3D.

On the other hand, attention will be directed to the conventional mode shown in FIGS. 13A and 13B. In this event, the second clock signal OSC2 is fixed to the logic low level. When the first clock signal OSC1 has the logic high level, the booster circuit is put into the first conventional state ST(c)1 illustrated in FIG. 4A. When the first clock signal OSC1 has the logic low level, the booster circuit is put into the second conventional state ST(c)2 illustrated in FIG. 4B.

Figure 14:
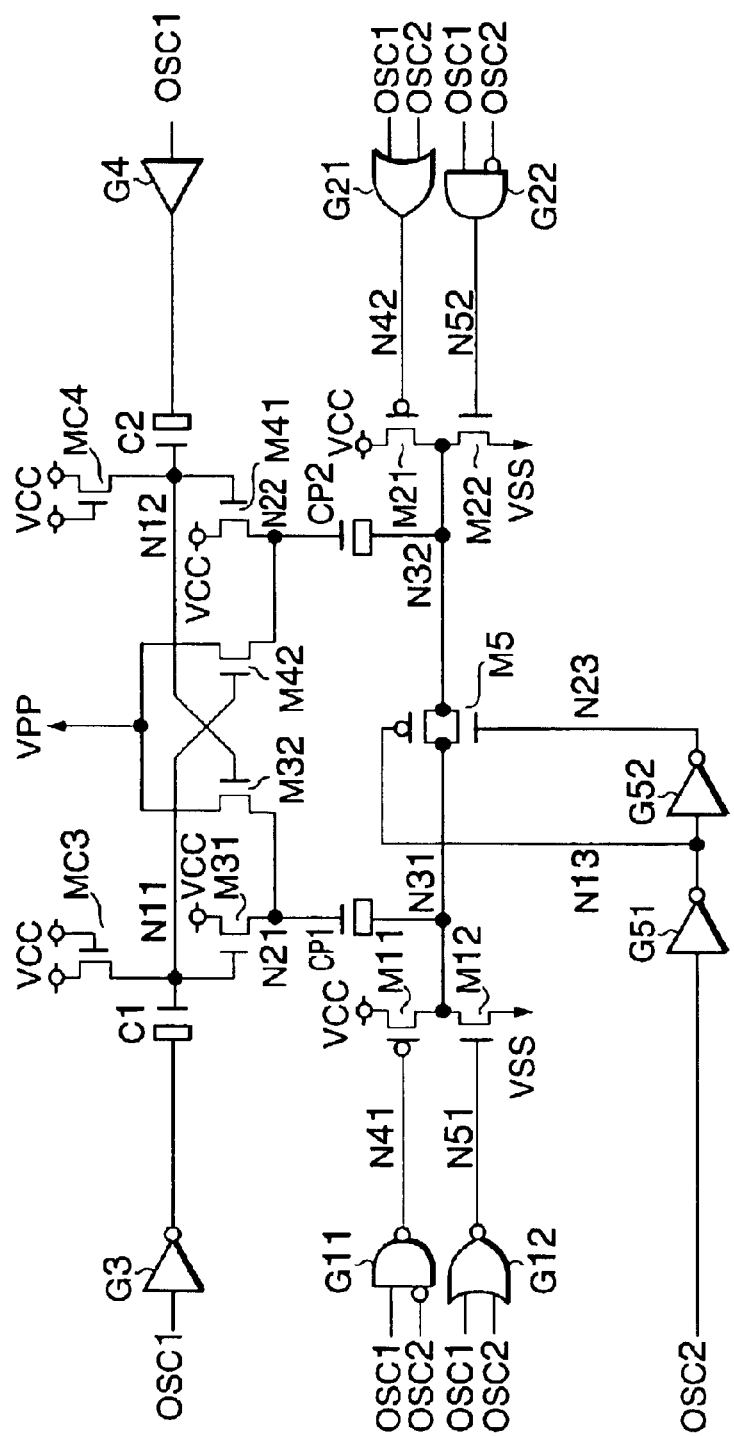
FIG. 14 is a circuit diagram of an example of the booster circuit illustrated in FIGS. 6A–6D, 7A, and 7B.

Referring to FIG. 14, the description will proceed to an example of the booster circuit illustrated in FIGS. 6A–6D, 7A, and 7B. The description will be made as regards a corresponding relationship between components in illustrated FIG. 14 and components illustrated in FIGS. 6A–6D, 7A, and 7B.

A combination of a primary PMOS transistor M11, a primary NMOS transistor M12, and a transfer gate M5 corresponds to the first switch S1. A combination of a secondary PMOS transistor M21, a secondary NMOS transistor M22, and the transfer gate M5 corresponds to the second switch S2. A combination of first and second ternary NMOS transistors M31 and M32 corresponds to the third switch S3. A combination of first and second quaternary NMOS transistors M41 and M42 corresponds to the fourth switch S4.

A node N31 corresponds to the first input node N1 while a node N32 corresponds to the second input node N2. A node N21 corresponds to the first intermediate node N3 while a node N22 corresponds to the second intermediate node N4. A signal line for connecting the nodes N31 and N32 through the transfer gate M5 corresponds to the connection line CL.

Other circuit elements constitute switch driving circuits for driving the first through the forth switches S1 to S5.

More specifically, a first inhibit gate G11 serves as a switch driving circuit for driving the primary PMOS transistor M11 of the first switch S1 in response to the first and the second clock signals OSC1 and OSC2. A NOR gate G12 serves as a switch driving circuit for driving the primary NMOS transistor M12 of the first switch S1 in response to the first and the second clock signals OSC1 and OSC2.

An OR gate G21 serves as a switch driving circuit for driving the secondary PMOS transistor M21 of the second switch S2 in response to the first and the second clock signals OSC1 and OSC2. A second inhibit gate G22 serves as a switch driving circuit for driving the secondary NMOS transistor M22 of the second switch S2 in response to the first and the second clock signals OSC1 and OSC2.

A combination of a first inverter G3 supplied with the first clock signal OSC1, a capacitor C1, and the a control NMOS transistor MC3 is operable not only as a switch driving circuit for driving the first ternary NMOS transistor M31 of the third switch S3 but also as a switch driving circuit for driving the second quaternary NMOS transistor M42 of the forth switch S4.

A combination of a buffer gate G4 supplied with the first clock signal OSC1, a capacitor C2, and a control NMOS transistor MC4 is operable not only as a switch driving circuit for driving the first quaternary NMOS transistor M41 of the fourth switch S4 but also as a switch driving circuit for driving the second ternary NMOS transistor M31 of the third switch S3.

A combination of a second inverter G51 supplied with the second clock signal OSC2 and a third inverter G52 acts as a switch driving circuit for controlling ON/OFF of the transfer gate M5 composed of the first and the second switches S1 and S2.

FIGS. 15A, 15B, 16A, and 16B are views showing waveforms of the first and the second clock signals OSC1 and OSC2. FIGS. 15A and 15B show the waveforms of the first and the second clock signals OSC1 and OSC2 on the low consumption current mode, respectively, while FIGS. 16A and 16B show the waveforms of the first and the second clock signals OSC1 and OSC2 on the conventional mode, respectively.

Attention will be directed to the low consumption current mode shown in FIGS. 15A and 15B. When the first clock signal OSC1 has a logic high level and the second clock signal OSC2 has a logic low level, the booster circuit is put into the first low consumption state ST'(lc)1 illustrated in FIG. 6A. When the first clock signal OSC1 has the logic low level and the second clock signal OSC2 has the logic high level, the booster circuit is put into the second low consumption state ST'(lc)2 illustrated in FIG. 6B. When both of the first and the second clock signals OSC1 and OSC2 have the logic low level, the booster circuit is put into the third low consumption state ST'(lc)3 illustrated in FIG. 6C. When both of the first and the second clock signals OSC1 and OSC2 have the logic high level, the booster circuit is put into the fourth low consumption state ST'(lc)4 illustrated in FIG. 6D.

On the other hand, attention will be directed to the conventional mode shown in FIGS. 16A and 16B. In this event, the second clock signal OSC2 is fixed to the logic low level. When the first clock signal OSC1 has the logic high level, the booster circuit is put into the first conventional state ST'(c)1 illustrated in FIG. 7A. When the first clock signal OSC1 has the logic low level, the booster circuit is put into the second conventional state ST'(c)2 illustrated in FIG. 7B.

FIGS. 17A–17G and 18A–18F are time charts showing operation waveforms in each portion of the booster circuit illustrated in FIG. 11. FIGS. 17A–17G show the operation waveforms on the low consumption current mode while FIGS. 18A–18F show the operation waveforms on the conventional mode.

In FIGS. 17A–17G, FIG. 17A shows a waveform of the first clock signal OSC1, FIG. 17B shows a waveform of the second clock signal OSC2, FIG. 17C shows waveforms at the nodes N11, N12, and N23, FIG. 17D shows waveforms at the nodes N41 and N51, FIG. 17E shows waveforms at the nodes N42 and N52, FIG. 17F shows waveforms at the nodes N21 and N31, and FIG. 17G shows waveforms at the nodes N22 and N32.

In FIGS. 18A–18G, FIG. 18A shows a waveform of the first clock signal OSC1, FIG. 18B shows a waveform of the second clock signal OSC2, FIG. 18C shows waveforms at the nodes N11 and N41, FIG. 18D shows waveforms at the nodes N12 and N42, FIG. 18E shows waveforms at the nodes N21 and N31, and FIG. 18F shows waveforms at the nodes N22 and N32.

FIGS. 19A–19G and 20A–20F are time charts showing operation waveforms in each portion of the booster circuit illustrated in FIG. 14. FIGS. 19A–19G show the operation waveforms on the low consumption current mode while FIGS. 20A–20F show the operation waveforms on the conventional mode.

In FIGS. 19A–19G, FIG. 19A shows a waveform of the first clock signal OSC1, FIG. 19B shows a waveform of the second clock signal OSC2, FIG. 19C shows waveforms at the nodes N11, N12, and N23, FIG. 19D shows waveforms at the nodes N41 and N51, FIG. 19E shows waveforms at the nodes N42 and N52, FIG. 19F shows waveforms at the nodes N21 and N31, and FIG. 19G shows waveforms at the nodes N22 and N32.

In FIGS. 20A–20G, FIG. 20A shows a waveform of the first clock signal OSC1, FIG. 20B shows a waveform of the second clock signal OSC2, FIG. 20C shows waveforms at the nodes N12, N42, and N52, FIG. 20D shows waveforms at the nodes N11, N41, and N51, FIG. 20E shows waveforms at the nodes N22 and N32, and FIG. 20F shows waveforms at the nodes N21 and N31.

Figure 21:
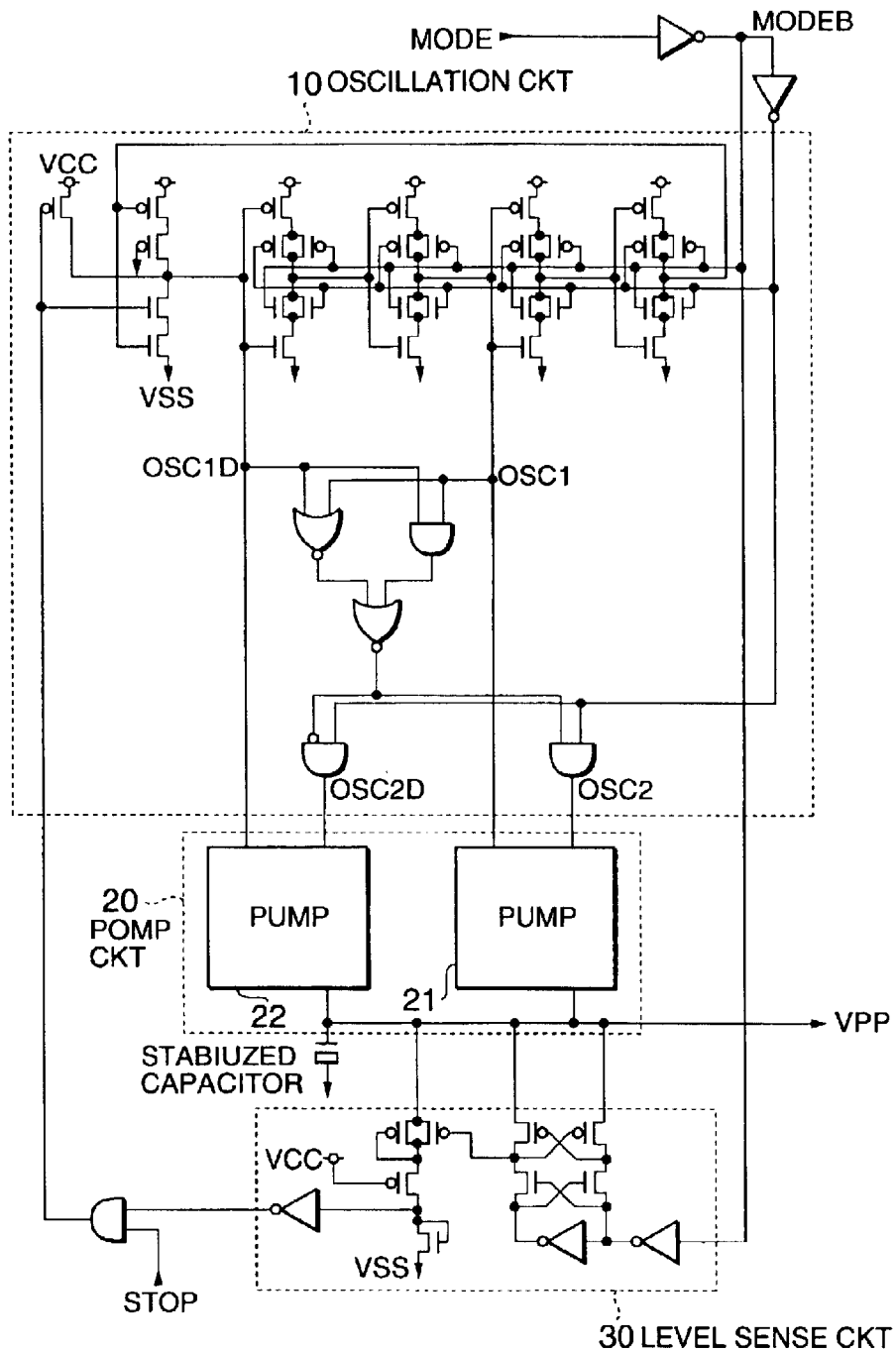
FIG. 21 is a block diagram showing a booster power supply circuit to which the booster circuit according to this invention is applicable.

FIG. 21 is a block diagram showing a booster power supply circuit to which the booster circuit according to this invention is applicable. The illustrated booster power supply circuit comprises an oscillation circuit 10, a pump circuit 20, and a level sense circuit 30. The pump circuit 20 consist of first and second pump circuits 21 and 22. Each of the first and the second pump circuits 21 and 22 is comprised of the booster circuit illustrated in FIG. 11 or FIG. 14.

The oscillation circuit 10 oscillates the first and the second clock signals OSC1 and OSC2 and first and second modified clock signals OSC1D and OSC2D. The first pump circuit 21 is supplied with the first and the second clock signals OSC1 and OSC2 while the second pump circuit 22 is supplied with the first and the second modified clock signals OSC1D and OSC2D.

Figure 22:
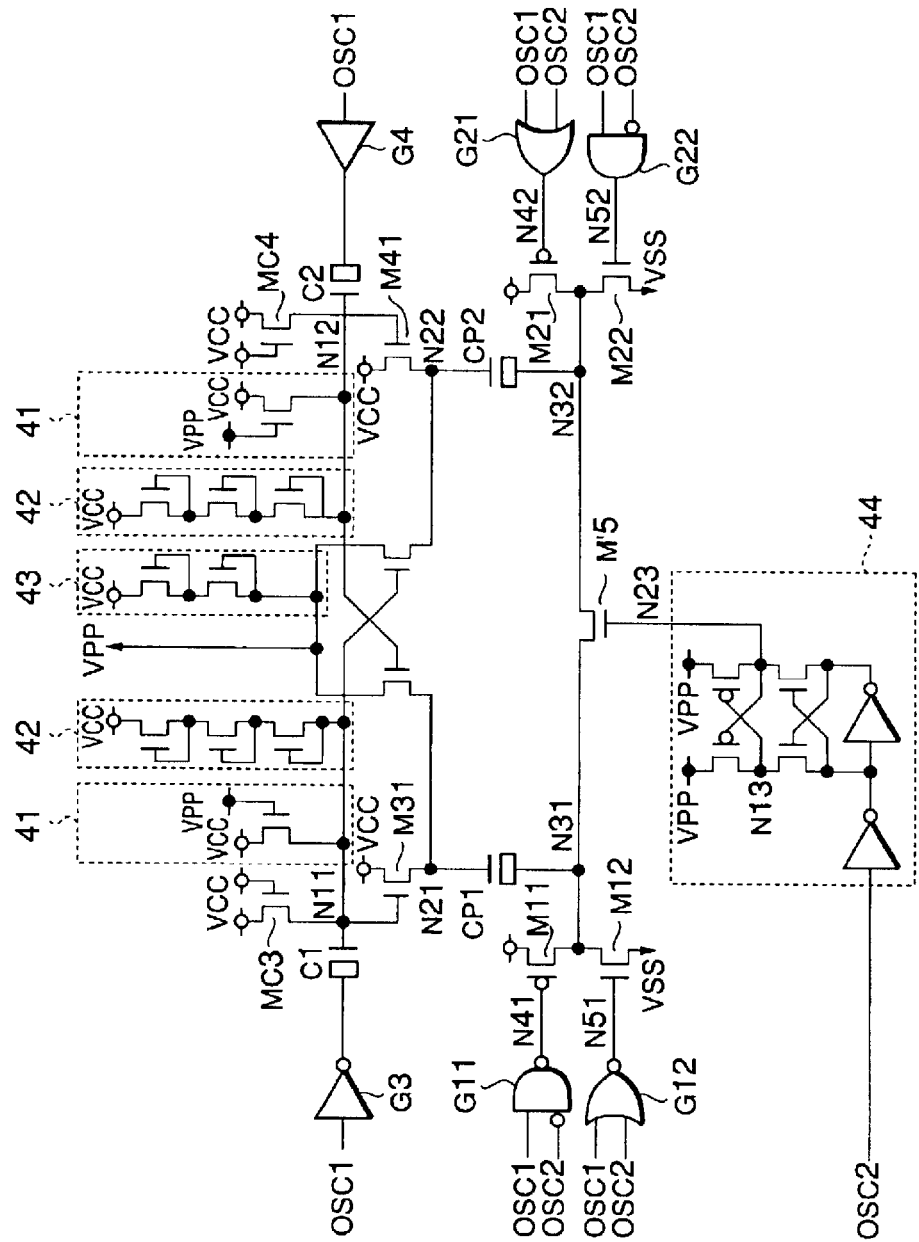
FIG. 22 is a circuit diagram showing a modified example of the booster circuit illustrated in FIG. 14.

FIG. 22 is a modified example of the booster circuit illustrated in FIG. 14. In FIG. 22, the same reference symbols are attached with similar components in FIG. 14 and the description will later be made about different portions. The node N11 is connected with a clamping MOS transistor 41 and an MOS diode 42 while the node N12 is connected with another clamping MOS transistor 41 and another MOS diode 42. The booster node is connected with an MOS diode 43. In lieu of the transfer gate M5, the booster circuit is provided with an NMOS transistor M'5 as a path gate which is switched by a level conversion circuit 44.

Figure 23:
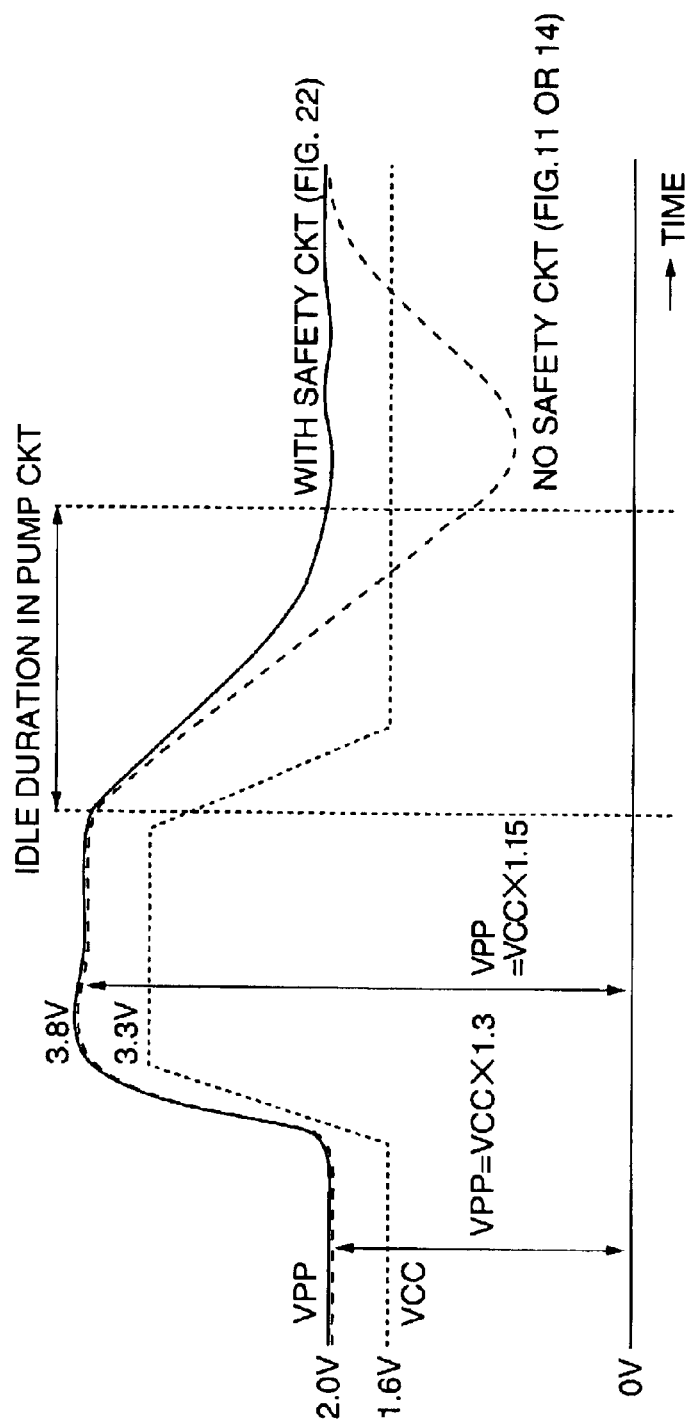
FIG. 23 shows AC characteristics in VPP supply of the booster circuit illustrated in FIG. 11 or FIG. 14 and of the booster circuit illustrated in FIG. 22.

FIG. 23 shows AC characteristics in VPP supply of the booster circuit illustrated in FIG. 11 or FIG. 14 and of the booster circuit illustrated in FIG. 22. In the booster circuit comprising a safety circuit (41, 42, and 43) as illustrated in FIG. 22, the boosted level VPP is not lower than the power-supply potential VCC if there is an idle duration in the pump circuit. On the other hand, in the booster circuit comprising no safety circuit as illustrated in FIG. 11 or FIG. 14, the boosted level VPP may be temporarily lower than the power-supply potential VCC if there is the idle duration in the pump circuit.

Figure 24A:
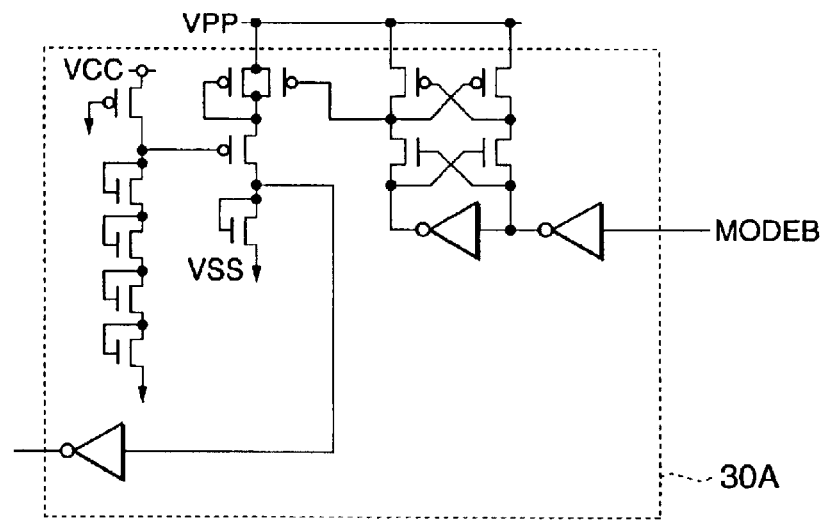
FIGS. 24A and 24B show first and second modified examples of a level sense circuit for use in the booster circuit illustrated in FIG. 21.
Figure 24B:
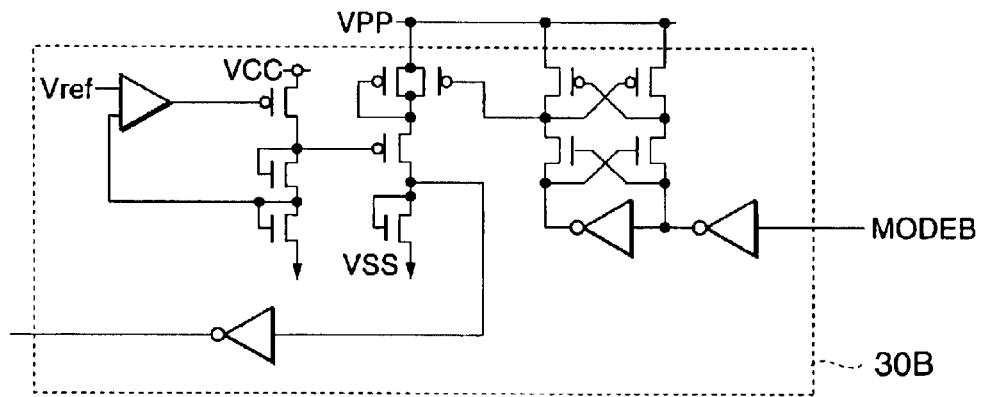

FIGS. 24A and 24B show first and second modified examples 30A and 30B of the level sense circuit 30, respectively.

Figure 25:
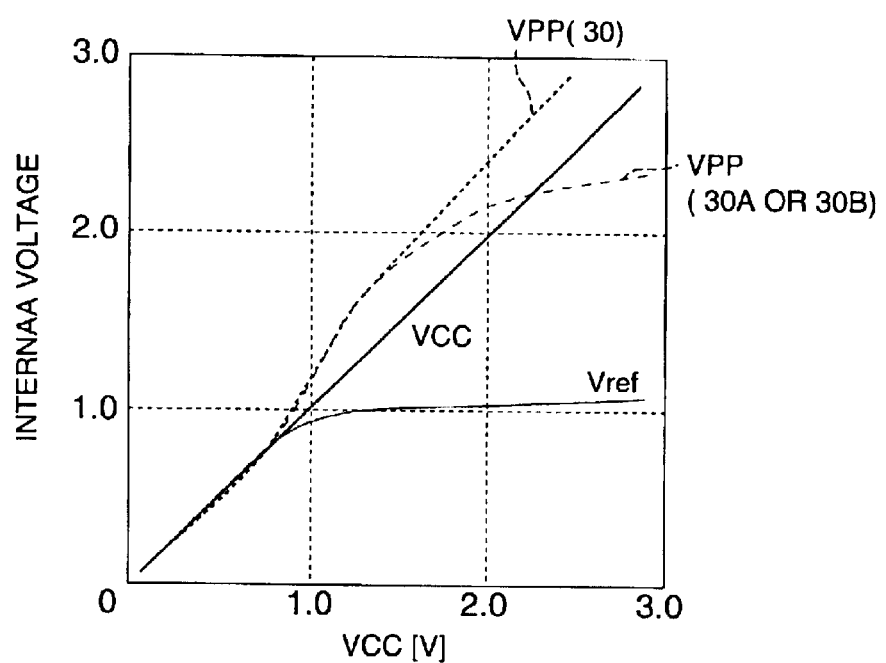
FIG. 25 shows characteristics of internal boosted voltages in the level sense circuit illustrated in FIG. 21 and in the modified level sense circuits illustrated in FIGS. 24A and 24B.

FIG. 25 shows characteristics of internal boosted voltages in the level sense circuit 30 illustrated in FIG. 21 and in the modified level sense circuits 30A and 30B illustrated in FIGS. 24A and 24B. In FIG. 25, the abscissa represents the power-supply potential VCC and the ordinate represents an internal voltage. As apparent from FIG. 25, dependency of the power-supply potential VCC in the boosting rate becomes dull in the modified examples 30A and 30B. It is therefore to possible to improve the current efficiency at a higher region of the power-supply potential VCC.

While this invention has thus far been described in conjunction with a few embodiments thereof, it will now be readily possible for those skilled in the art to put this invention into practice in various other manners.

What is claimed is:

1. A booster circuit having a power-supply node supplied with a power-supply voltage, a ground node supplied with a ground voltage, a booster node for generating a boosted level, first and second input nodes, and first and second intermediate nodes, said booster circuit comprising a first pump capacitor connected between said first input node and said first intermediate node and a second pump capacitor connected between said second input node and said second intermediate node, said booster circuit comprising:

a first switch having a first fixed contact fixedly connected to said first input node and a first moving contact which is selectively connected to one of said power-supply node, said ground node, and said booster node;

a second switch having a second fixed contact fixedly connected to said second input node and a second moving contact which is selectively connected to one of said power-supply node, said ground node, and said booster node;

a third switch having a third fixed contact and a third moving contact disposed between said first and said second intermediate nodes, said third switch making or breaking between said first and said second intermediate nodes;

a fourth switch having a fourth fixed contact fixedly connected to said first intermediate node and a fourth moving contact which is selectively connected to one of said power-supply node, said booster node, and a non-connective node connected to nowhere;

a fifth switch having a fifth fixed contact fixedly connected to said second intermediate node and fifth moving contact which is selectively connected to one of said power-supply node, said booster node, and said non-connective node.

2. A method of driving said booster circuit as claimed in claim 1 at a low consumption current mode which repeatedly puts said booster circuit into first through fourth low consumption states, wherein said method drives said booster circuit:

at said first low consumption state so that said first switch connects said first input node with said ground node, said second switch connects said second input node with said power-supply node, said third switch breaks, said fourth switch connects said first intermediate node with said power-supply node, and said fifth switch connects said second intermediate node with said booster node;

at said second low consumption state so that said first switch connects said first input node with said power-supply node, said second switch connects said second input node with said booster node, said third switch makes, said fourth switch connects said first intermediate node with said non-connective node, and said fifth switch connects said second intermediate node with said non-connective node;

at said third low consumption state so that said first switch connects said first input node with said power-supply node, said second switch connects said second input node with said ground node, said third node breaks, said fourth switch connects said first intermediate node with said booster node, and said fifth switch connects said second intermediate node with said power-supply node; and at said fourth low consumption state so that said first switch connects said first input node with said booster node, said second switch connects said second input node with said power-supply node, said third switch makes, said fourth switch connects said first intermediate node with said non-connective node, and said fifth switch connects said second intermediate node with said non-connective node.

3. A method of driving said booster circuit as claimed in claim 1 at a conventional mode which repeatedly puts said booster circuit into first and second conventional states, wherein said method drives said booster circuit:

at said first conventional state so that said first switch connects said first input node with said ground node, said second switch connects said second input node with said power-supply node, said third switch breaks, said fourth switch connects said first intermediate node with said power-supply node, and said fifth switch connects said second intermediate node with said booster node; and at said second conventional state, said first switch connects said first input node with said power-supply node, said second switch connects said second input node with said ground node, said third switch breaks, said fourth switch connects said first intermediate node with said booster node, and said fifth switch connects said second intermediate node with said power-supply node.

4. A booster circuit having a power-supply node supplied with a power-supply voltage, a ground node supplied with a ground voltage, a booster node for generating a boosted level, first and second input nodes, and first and second intermediate nodes, said booster circuit comprising a first pump capacitor connected between said first input node and said first intermediate node and a second pump capacitor connected between said second input node and said second intermediate node, said booster circuit comprising:

a connection line extending between the vicinity of said first input node and the vicinity of said second input node;

a first switch having a first fixed contact fixedly connected to said first input node and a first moving contact which is selectively connected to one of said power-supply node, said ground node, and said connection line;

a second switch having a second fixed contact fixedly connected to said second input node and a second moving contact which is selectively connected to one of said power-supply node, said ground node, and said connection line;

a third switch having a third fixed contact fixedly connected to said first intermediate node and a third moving contact which is selectively connected to either said booster node or said power-supply node; and a fourth switch having a fourth fixed contact fixedly connected to said second intermediate node and a fourth moving contact which is selectively connected to either said booster node or said power-supply node.

5. A method of driving said booster circuit as claimed in claim 4 at a low consumption current mode which repeatedly puts said booster circuit into first through fourth low consumption states, wherein said method drives said booster circuit:

at said first low consumption state so that said first switch connects said first input node with said power-supply node, said second switch connects said second input node with said ground node, said third switch connects said first intermediate node with said booster node, and said fourth switch connects said second intermediate node with said power-supply node;

at said second low consumption state so that said first switch connects said first input node with said connection line, said second switch connects said second input node with said connection line, said third switch connects said first intermediate node with said power-supply node, and said fourth switch connects said second intermediate node with said booster node;

at said third low consumption state so that said first switch connects said first input node with said ground node, said second switch connects said second input node with said power-supply node, said third switch connects said first intermediate node with said power-supply node, and said fourth switch connects said second intermediate node with said booster node; and at said fourth low consumption state so that said first switch connects said first input node with said connection line, said second switch connects said second input node with said connection line, said third switch connects said first intermediate node with said booster node, and said fourth switch connects said second intermediate node with said power-supply node.

6. A method of driving said booster circuit as claimed in claim 4 at a conventional mode which repeatedly puts said booster circuit into first and second conventional states, wherein said method drives said booster circuit:

at said first conventional state so that said first switch connects said first input node with said power-supply node, said second switch connects said second input node with said ground node, said third switch connects said first intermediate node with said booster node, and said fourth switch connects said second intermediate node with said power-supply node; and at said second conventional state so that said first switch connects said first input node with said ground node, said second switch connects said second input node with said power-supply node, said third switch connects said first intermediate node with said power-supply node, and said fourth switch connects said second intermediate node with said booster node.

7. A booster circuit as claimed in claim 4, wherein further comprises a safety circuit.

8. A booster circuit comprising:

a first pump capacitor;

a second pump capacitor; and a plurality of switches for selectively coupling said first and second nump capacitors to each other and to a power supply node, a around node, and a booster node, wherein in a first state, said first pump capacitor is coupled between said second pump capacitor and said power supply node and wherein in a second state, said first pump capacitor is coupled between said second pump capacitor and said booster node;

wherein in said first and second states, said first and second pump capacitors are coupled to each other by coupling a terminal of said first pump capacitor having a particular polarity with a terminal of said second pump capacitor having a same polarity.

9. A booster circuit as claimed in claim 8, wherein the particular polarity is positive.

10. A booster circuit comprising:

a first pump capacitor;

a second pump capacitor; and a plurality of switches for selectively coupling said first and second pump capacitors to each other and to a power supply node, a ground node, and a booster node, wherein in a first state, said first pump capacitor is coupled between said second pump capacitor and said power supply node and wherein in a secand state, said first pump capacitor is coupled between said second pump capacitor and said booster node;

wherein, in said first state, said second pump capacitor is also coupled to said booster node and wherein in said second state, said second pump capacitor is also coupled to said power supply node.

11. A booster circuit as claimed in claim 10, wherein in said first state, a negative tenninal of said first pump capacitor is coupled to said power supply node while a negative terminal of said second pump capacitor is coupled to said booster node.

12. A booster circuit as claimed in claim 11, wherein in said second state, a negative terminal of said first pump capacitor is coupled to said booster node while a negative terminal of said second pump capacitor is coupled to said power supply node.

13. A booster circuit comprising:

a first pump capacitor;

a second pump capacitor; and a plurality of switches for selectively coupling said first and second pump capacitors to each other and to a power supply node, a ground node, and a booster node, wherein in a first state, said first pump capacitor is coupled between said second pump capacitor and said power supply node and wherein in a second state, said first pump capacitor is coupled between said second pump capacitor and said booster node;

wherein there are additional states between said first and second states.

14. A booster circuit as claimed in claim 13, wherein, in the additional states, one of said pump capacitors is coupled between said power supply node and said ground node and the other one of said pump capacitors is coupled between said power supply node and said booster node.

15. A booster circuit as claimed in claim 15, wherein there are two additional states.

16. A booster circuit as claimed in claim 15, wherein one of said two additional states is after said second state and before said first state and includes coupling said first pump capacitor to said ground node and said power supply node while coupling said second pump capacitor to said power supply node and said booster node.

17. A booster circuit as claimed in claim 16, wherein said one of said two additional states includes coupling a negative terminal of said first pump capacitor to said ground node and a positive terminal of said first pump capacitor to said power supply node while coupling a negative terminal of said second pump capacitor to said power supply node and coupling a positive terminal of said second pump capacitor to said booster node.

* * * * *